US009816894B2

(12) United States Patent
Wilcox et al.

(10) Patent No.: US 9,816,894 B2
(45) Date of Patent: Nov. 14, 2017

(54) GAS MONITORING DEVICE, SYSTEM AND METHODS

(71) Applicants: Loren Wilcox, Pinedale, WY (US); Matt Murdock, Pinedale, WY (US)

(72) Inventors: Loren Wilcox, Pinedale, WY (US); Matt Murdock, Pinedale, WY (US)

(\*) Notice: Subject to any disclaimer, the term of this patent is extended or adjusted under 35 U.S.C. 154(b) by 178 days.

(21) Appl. No.: 14/484,836

(22) Filed: Sep. 12, 2014

(65) Prior Publication Data

US 2015/0068287 A1   Mar. 12, 2015

Related U.S. Application Data

(60) Provisional application No. 61/877,122, filed on Sep. 12, 2013.

(51) Int. Cl.
*F16K 37/00* (2006.01)
*G01M 3/04* (2006.01)
*G01M 3/22* (2006.01)

(52) U.S. Cl.
CPC ............... *G01M 3/04* (2013.01); *G01M 3/22* (2013.01); *Y10T 29/49117* (2015.01)

(58) Field of Classification Search
CPC ...... G01M 3/22; G01M 3/04; Y10T 29/49117
USPC ........................................................ 137/559
See application file for complete search history.

(56) References Cited

U.S. PATENT DOCUMENTS

| | | | | |
|---|---|---|---|---|
| 5,126,934 | A * | 6/1992 | MacFadyen | F17D 1/04 137/487.5 |
| 2009/0216350 | A1* | 8/2009 | Boger | F15B 5/006 700/79 |
| 2012/0045947 | A1* | 2/2012 | Molnar | H05K 7/1468 439/700 |

OTHER PUBLICATIONS

RKI Direct Connect sensor catalog, Pub date Dec. 19, 2010 as per "http://web.archive.org/web/20100715000000*/http://www.rkiinstruments.com/pdf/Direct_Connect.pdf".*

\* cited by examiner

*Primary Examiner* — Umashankar Venkatesan
(74) *Attorney, Agent, or Firm* — Rutan & Tucker LLP; Hani Z. Sayed

(57) ABSTRACT

A gas monitoring system for continuously detecting leakage of at least one gas and being operable in an extreme climate condition, the system involving a processor; at least one emergency shutdown valve responsive to a set of instructions from the processor; and a user interface in communication with the processor. The system further involves a weather-proof enclosure for housing system components. The weather-proof enclosure is adapted to operate at a temperature range of ambient temperature to a below-freezing temperature, wherein the at least one emergency shutdown valve comprises at least one latch valve.

2 Claims, 16 Drawing Sheets

GAS MONITORING DEVICE, SYSTEM AND METHODS

CROSS-REFERENCE TO RELATED APPLICATION(S)

The document is a non-provisional patent application the benefit of, and priority to, U.S. Provisional Patent Application Ser. No. 61/877,122, filed on Sep. 12, 2013, entitled "Gas Monitoring System with Mounted ESD that Activates in Hazardous Conditions," which is hereby incorporated by reference in its entirety for all purposes.

TECHNICAL FIELD

The present disclosure technically relates to the field of electronic monitors. More particularly, the present disclosure technically relates to the field of electronic gas monitors. More particularly, the present disclosure technically relates to the field of electronic gas monitors for the oil and gas industry.

BACKGROUND

In the related art, energy independence is currently a major national goal. In North America, the relatively recent discoveries of oil deposits in shale gale has spurred emerging technologies for extraction thereof as well as for extraction of coexisting natural gas hitherto unrecoverable. In the extraction effort, "fugitive" natural gas emissions potentially occur anywhere along a supply chain, such as a gas pipeline, and may eviscerate the "green" benefits of burning a clean fuel as loose methane ($CH_4$) may be more environmentally hazardous than the principal greenhouse gas (GHG), the contributor carbon dioxide ($CO_2$).

In addition, the Department of Energy (DoE) mandates that companies, engaging in natural gas exploration and reclamation, such as natural gas producers and distributors, implement systems for detecting and measuring gas leaks in wellheads and aging pipeline infrastructure. Related art techniques for monitoring gas emissions at a production site are fraught with challenges, such as in relation to an aging pipeline infrastructure. For instance, the related art technologies are not effective in detecting leaks. The most common related art method for detecting natural gas leaks include manual inspection by using a low sensitivity hand-held device, requiring a highly trained technician, which remains subject to human error. In an oil well system, having greater than 500,000 wellheads, extensive main and service pipelines, tremendous volume and expanse, potential for human error renders accurate and timely detection impossible.

Currently, most natural gas field operations take place on public lands, wherein the use thereof, and the access thereto, is open, and wherein personnel, such as oil and gas field workers, may be inadvertently exposed to hazards without sufficient warning. One such hazard is the potential for natural gases escaping the ground at extreme high pressures, wherein some of these natural gases are also extremely hazardous, such as hydrogen sulfide ($H_2S$), volatile organic compounds (VOCs), methane ($CH_4$), and the like, and wherein even small quantities thereof may result in sickness and death in living organisms. The now popular term "fugitive emissions" encapsulates a broad range of gases that are unintentionally, but harmfully, entering the atmosphere. Gas leaks may emanate from production equipment, such as separators, dehydrators "dehys," and compressor stations, production facilities, such as pipelines, refineries, and manufacturing facilities, and mining facilities, such as underground mines.

In the related art, many field workers carry and wear personal gas monitors in an attempt to provide some warning. However, these related art personal gas monitors are electronic devices, using personal detectors, that experience two significant short-comings: (1) inefficient operation at freezing or below freezing temperatures efficiently with dangerous leaking of gases; and (2) close proximity of the worker to dangerous gases due to limitations of the related art monitor operability, thereby dangerously exposing the field worker for as long as 10-15 seconds until a warning finally sounds.

In addition to the dangers associated with natural gas production sites, coal mines and buildings with natural gas have inherent dangers from which workers and the public require protection. For instance, in 20% to 50% of fires following earthquakes in California have originated from natural gas leaks. Of the 150,000 customers without service after the 1994 Northridge earthquake, 15,000 of the interrupted services have been found to have gas leaks of unspecified severity. Emergency responders also are at risk when they arrive on scenes that may be saturated with hazardous gases. As such, a need exists for a detection system and method that eliminates human error, minimizes human contact, is rapidly operative, and is conducive for use with vast gas pipeline systems.

SUMMARY OF THE INVENTION

The present disclosure generally involves a gas monitoring system with a mounted ESD latch valve that activates in hazardous conditions for providing early warning to supervisors and the public. The multiple gas monitoring system has an installed emergency shutdown (ESD) latch valve that can operate in cold-weather climates as well. The present disclosure also generally involves a gas monitoring system, comprising: an emergency shutdown (ESD) device, having an emergency shutdown (ESD) latch valve; at least one multiple gas detection monitoring device; a least one Modbus transmitter relay; at least one control printed circuit board (PCB) having at least one display, such as a light-emitting diode (LED) display, e.g., an organic light-emitting diode (OLED) display for use in the production of natural gas.

Some of the features in the present disclosure are outlined, rather broadly, in order that the detailed description thereof may be better understood and in order that the present contribution to the art may be better appreciated. Additional features of the present disclosure are described hereinafter. In this respect, understood is that the present disclosure is not limited in its application to the details of construction or to the arrangements of the components set forth in the following description or illustrated in the drawings. The present disclosure is capable of other embodiments and of being practiced and carried out in various ways. Also, understood is that the phraseology and terminology employed herein are for the purpose of the description and should not be regarded as limiting.

To this end, in an exemplary embodiment, a gas monitoring system for continuously detecting leakage of at least one gas and being operable in an extreme climate condition, the system comprising: a processor; at least one emergency shutdown valve responsive to a set of instructions from the processor; and a user interface in communication with the processor.

In another exemplary embodiment, further comprising a weather-proof enclosure for housing system components, the weather-proof enclosure adapted to operate at a temperature range of ambient temperature to a below-freezing temperature, wherein the at least one emergency shutdown valve comprises at least one latch valve.

In another exemplary embodiment, wherein at least one latch valve is configured to operate on a 24 VDC or 115 VAC/230 VAC electrical system.

In another exemplary embodiment, further comprising at least one multi-channel relay for simultaneously monitoring at least one gas, at least one multi-channel relay in communication with the processor.

In another exemplary embodiment, wherein at least one multi-channel relay comprises at least one Modbus transmitter.

In another exemplary embodiment, wherein at least one Modbus transmitter is rated for a range of approximately 4 mA to approximately 20 mA.

In another exemplary embodiment, further comprising at least one ESD control circuit operatively coupled with at least one emergency shutdown valve and in communication with at least one multi-channel relay.

In another exemplary embodiment, further comprising an emergency shutdown reset switch operably coupled with at least one ESD control circuit.

In another exemplary embodiment, further comprising at least one warning feature responsive to at least one multi-channel alarm relay.

In another exemplary embodiment, wherein at least one warning feature comprises at least one of: an audible alarm having an optional silencing feature; a visual alarm; an alarm reset switch; and a backup battery feature.

In another exemplary embodiment, wherein at least one warning feature is programmable and comprises a plurality of warning levels corresponding to predetermined warning thresholds, and wherein the predetermined warning thresholds comprise approximately three programmable alarm levels per channel.

In another exemplary embodiment, wherein the user interface comprises: a control PCB panel; and a display operably coupled with the control PCB panel.

In another exemplary embodiment, wherein the display comprises a digital display.

In another exemplary embodiment, wherein the digital display comprises at least one of an LED display and an LCD display, and wherein the digital display is in bi-directional communication with the processor.

In another exemplary embodiment, further comprising: at least one detector relay in communication with the processor; at least one direct-connect sensor in communication with the at least one detector relay; and at least one remote slave sensor device in communication with the at least one detector relay.

In another exemplary embodiment, further comprising an alarm reset switch operably coupled with the processor.

In another exemplary embodiment, further comprising a power source for powering the processor.

In another exemplary embodiment, wherein at least one direct-connect sensor comprises at least one of an infrared sensor, a catalytic sensor, an electro-chemical sensor, a Riken sensor, a flame detector, and a photo-ionization detector.

In an exemplary embodiment, a method of fabricating a gas monitoring system for continuously detecting leakage of at least one gas and being operable in an extreme climate condition, the method comprising: providing a processor; providing at least one emergency shutdown valve responsive to a set of instructions from the processor; and providing a user interface in communication with the processor.

In another exemplary embodiment, a method of monitoring at least one gas by way of a gas monitoring system for continuously detecting leakage of at least one gas and being operable in an extreme climate condition, the method comprising: providing a gas monitoring system: providing a processor; providing at least one emergency shutdown valve responsive to a set of instructions from the processor; and providing a user interface in communication with the processor; commencing operation by powering the gas monitoring system; sensing a gas level by way of at least one direct-connect sensor; determining the gas level using data obtained by at least one direct-connect sensor; determining whether the gas level is less than a threshold value; if the gas level is less than the threshold value, sensing a gas level by way of at least one direct-connect sensor, if the gas level is at least the threshold value, proceeding to performing a limit test, and performing the limit test, if the gas level is less than the limit, determining the gas level using data obtained by the at least one direct-connect sensor, if the gas level is equal to the limit, sending a warning by way of a first alarm feature, if the gas level exceeds the limit, sending a warning and activating an alarm by way of a second alarm feature, and if the gas level greatly exceeds the limit by a predetermined value, sending a warning, activating an alarm, and activating an ESD latch valve by way of a third alarm feature, and terminating operation of the gas monitoring system.

A feature of the present disclosure involves a gas monitoring system with a mounted ESD that activates in hazardous conditions, thereby providing early warning to supervisors and the public, wherein the multiple gas monitoring system has an installed emergency shutdown (ESD) latch valve that can also operate in cold-weather climates.

Another feature of the present disclosure involves a gas monitoring system with a mounted ESD that activates in hazardous conditions and that is in full-time operation detecting multiple natural gases during the drilling or production of natural gases.

Another feature of the present disclosure involves a gas monitoring system with a mounted ESD that activates in hazardous conditions and that measures and monitors multiple natural gas concentrations in a local environment.

Another feature of the present disclosure involves a gas monitoring system with a mounted ESD that activates in hazardous conditions and that sends an electronic warning to field supervisors through a Modbus transmitter (digital or analog) if hazardous conditions develop.

Another feature of the present disclosure involves a gas monitoring system with a mounted ESD that activates in hazardous conditions and that visibly and audibly warns anyone within close proximity if a hazardous or dangerous environment exists.

Another feature of the present disclosure involves a gas monitoring system with a mounted ESD that activates in hazardous conditions and that will quickly shut down, or close, all gas flowing operations in the event of a specified alarm when a dangerous or hazardous environment is detected.

Another feature of the present disclosure involves a gas monitoring system with a mounted ESD that activates in hazardous conditions and that protects employees and other persons from unknowingly entering into a dangerous atmosphere and stops hazardous gases from uncontrolled venting.

In accordance with an embodiment of the present disclosure, the gas monitoring system is disposable within production equipment, such as dehydration units, and is configured to provide early warning to personnel located outside of such production equipment, whereby a gas field employee is alerted well ahead of time as to whether he/she may be entering an area having a dangerous condition. Furthermore, the gas monitoring system is equipped with a display comprising an organic LED readout, the display operable at temperature range of approximately −40° F. to approximately 120° F., thereby enabling use of the gas monitoring system in geographic regions having an average winter temperature of approximately −15° F. The gas monitoring system can be programmed to use a telemetry system for facilitating immediate transmission of a warning to personnel with a need to know, whereby gas field companies may stop pumping as soon as possible for preventing any venting of gases, thereby protecting personnel as well as the environment, and thereby preventing a dangerous build-up of flammable gases otherwise resulting in damage to equipment.

In accordance with an embodiment of the present disclosure, the gas monitoring system offers an inexpensive and powerful solution to ambient air monitoring that would improve coverage of refineries and manufacturing facilities, thereby improving monitoring coverage, and thereby allowing facilities personnel to track, in real-time, the consequences of an "event" and to assure that routes and rally points are indeed safe. Further, with growing EPA restrictions upon states and counties, embodiments of the gas monitoring system in the present disclosure provide an inexpensive solution for improving defining areas in nonattainment and allows an open verification of gas concentrations. The gas monitoring system further prevents lost revenues in both product and fines.

Other features of the present disclosure that may become apparent are intended to be within the scope of the present disclosure. To the accomplishment of the above and related features, this disclosure may be embodied in the form illustrated in the accompanying drawings, attention being called to the fact, however, that the drawings are illustrative only, that changes may be made in the specific construction illustrated and described, and that such changes are within the scope of this disclosure.

BRIEF DESCRIPTION OF THE DRAWING

The above, and other, aspects, features, and advantages of several embodiments of the present disclosure will be more apparent from the following Detailed Description as presented in conjunction with the following several figures of the Drawing.

Figure 1:
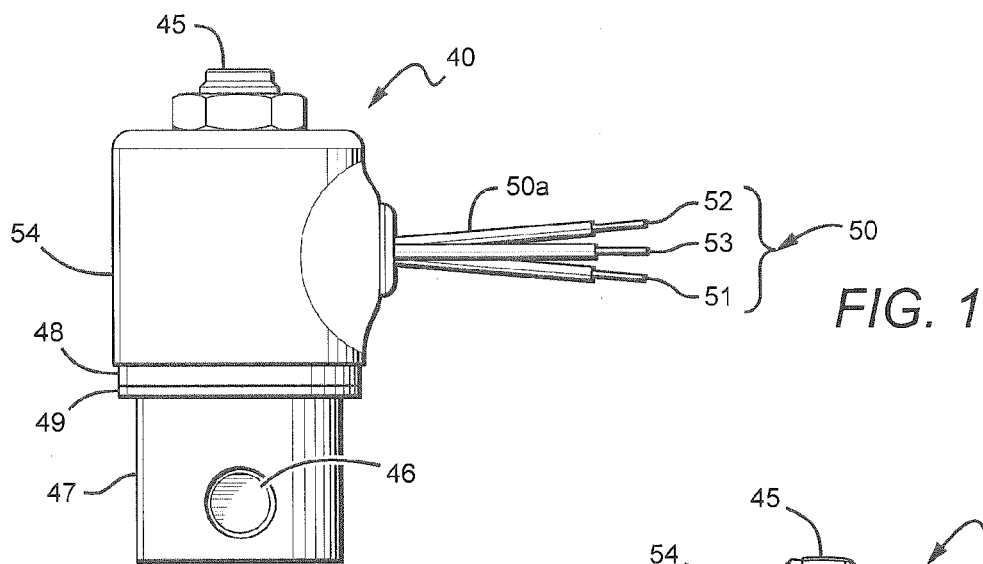
FIG. 1 is a schematic diagram illustrating a side view of a sub-component, such as an ESD latch valve, comprising a solenoid valve, of a gas monitoring system, as shown in FIG. 1, in accordance with an embodiment of the present disclosure.

Corresponding reference characters indicate corresponding components throughout the several figures of the Drawing. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood, elements that are useful or necessary in commercially feasible embodiment are often not depicted in order to facilitate a less obstructed view of these various embodiments of the present disclosure.

DETAILED DESCRIPTION

A. Overview

Turning now descriptively to the drawings, in which similar reference characters denote similar elements throughout the several views, the several figures of the Drawing illustrate a gas monitoring system capable of a multiple gas detection, a Modbus transmitter relay, an OLED control display, and the emergency shutdown (ESD) latch valve, in accordance with embodiments of the present disclosure.

B. Index of Elements

The following list of elements is illustrative and for facilitating reference to the several figures of the Drawing.
- 10: gas monitoring system, e.g., a multiple gas detection and monitoring system
- 11: a digital display, e.g., an OLED digital display or an LCD digital display
- 12: direct-connect sensors, e.g., electro-chemical, catalyst, or infrared sensors
- 13: 4-20 mA Modbus transmitter (digital or analog)
- 14: 4-channel relays
- 15: audible 100 db alarm, e.g., a buzzer
- 16: red, LED strobe light
- 17: weather-proof enclosure, e.g., a NEMA 4× or a Class 1, Division 1, enclosure
- 18: remote slave sensor
- 19: detector relays
- 20: 4 mA-20 mA Modbus transmitter relay
- 21: 4 mA-20 mA transmitter (digital or analog)
- 30: a PCB control and display panel, e.g., having an LED display and LCD display
- 31: LED display panel, e.g., an OLED display panel
- 32: display
- 32a: display cable
- 40: emergency shut-down (ESD) latch valve
- 41: PCB circuit relay
- 42: flexible rubber hose
- 43: brass fittings
- 44: manual ESD reset switch
- 45: exhaust port or a stop port
- 46: one intake port or inlet port
- 47: valve body
- 48: magnetic material
- 49: flux plate
- 50: plurality of electrical wires
- 51: first wire
- 52: second wire
- 53: third wire
- 54: coil
- 55: main printed circuit board (PCB)
- 70: processor
- 71: alarm reset feature C. Various Embodiments Referring to FIG. 1, this schematic diagram illustrates, in a side view, a sub-component, such as an ESD latch valve 40, comprising an electromechanical valve, such as a solenoid valve, of a gas monitoring system 10 (not shown), in accordance with an embodiment of the present disclosure. The solenoid valve comprises: a 3-way solenoid valve in a normally closed position having a latching mechanism for opening and closing thereof. The solenoid valve further comprises at least one of: an orifice size in a range of approximately 1/16 inch by 1/16 inch; a voltage rating of approximately 24 VDC; a power rating in a range of approximately 7 W to approximately 9 W; pressure rating of approximately 40 psi; at least one seal comprising a hydrin material; a core or plunger (not shown) comprising a least one of a hydrin material and a magnetic material 48; at least one O-ring (not shown) comprising a nitrile material; at least one seat body portion (not shown) comprising a nitrile material; at least one port, such as an exhaust port or a stop port 45, and at least one intake port or inlet port 46; a valve body 47 comprising brass; a coil 54 comprising a Class B epoxy encapsulated component having a temperature rating of approximately 130° C.; a duty cycle that is intermittent; and a leakage feature (not shown) that is bubble-tight. The latching mechanism comprises a plurality of electrical wires 50 having an insulation layer 50a comprising a polymeric material, such as tetrafluoroethylene (TFE), wherein a first wire 51 facilitates latching by transmitting electrical signals therefor, a second wire 52 facilitates unlatching by transmitting electrical signals therefor, and a third wire 53 acts as a common, neutral, or ground wire, whereby flux is directed though the core or plunger (not shown) to a flux plate 49.

Figure 2:
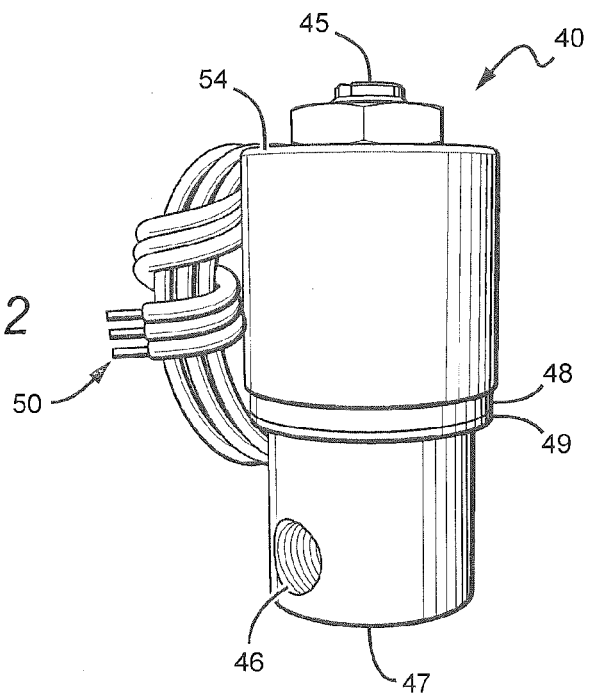
FIG. 2 is a schematic diagram illustrating a perspective view of a sub-component, such as an ESD latch valve, comprising a solenoid valve, of a gas monitoring system, as shown in FIG. 1, in accordance with an embodiment of the present disclosure.

Referring to FIG. 2, this schematic diagram illustrates, in a perspective view, a sub-component, such as an ESD latch valve 40, comprising an electromechanical valve, such as a solenoid valve, of a gas monitoring system 10, as shown in FIG. 1, in accordance with an embodiment of the present disclosure.

Figure 3:
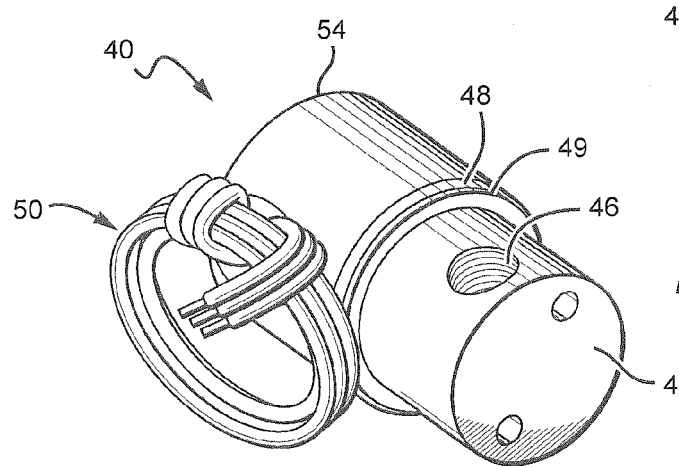
FIG. 3 is a schematic diagram illustrating an alternative perspective view of a sub-component, such as an ESD latch valve, comprising a solenoid valve, of a gas monitoring system, as shown in FIG. 1, in accordance with an embodiment of the present disclosure.

Referring to FIG. 3, this schematic diagram illustrates, in an alternative perspective view, a sub-component, such as an ESD latch valve 40, comprising an electromechanical valve, such as a solenoid valve, of a gas monitoring system 10, as shown in FIG. 1, in accordance with an embodiment of the present disclosure.

Figure 4:
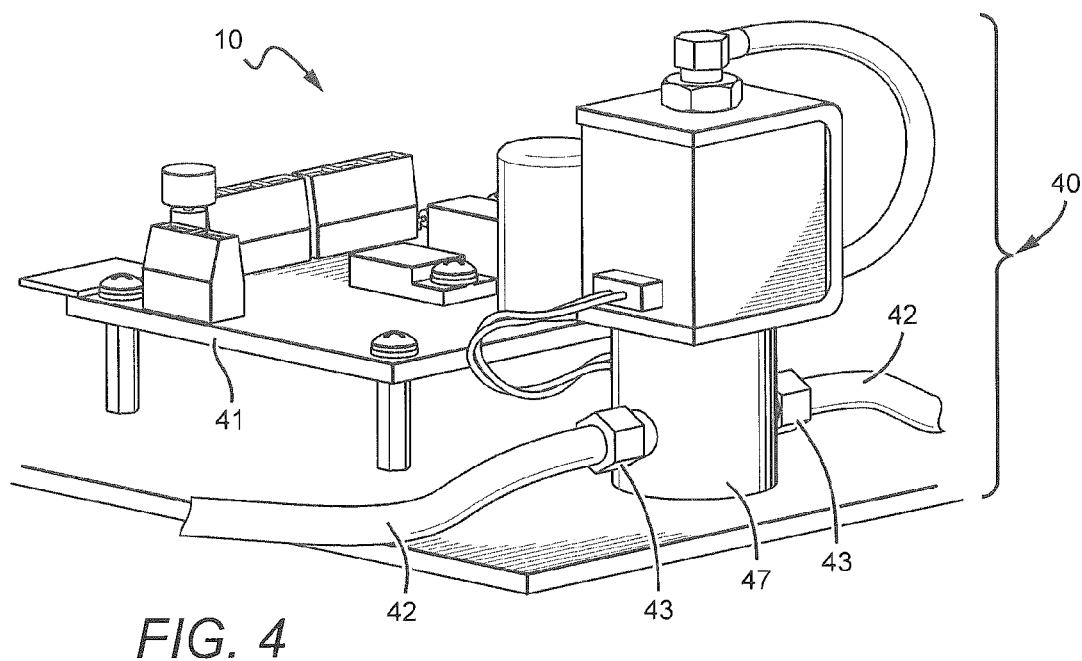
FIG. 4 is a schematic diagram illustrating a perspective view of a gas monitoring system, having an ESD latch valve, comprising a solenoid valve, having exterior fittings and rubber hoses coupled therewith, in accordance with an embodiment of the present disclosure.

Referring to FIG. 4, this schematic diagram illustrates, in a perspective view, of a gas monitoring system 10, having an ESD latch valve 40, comprising a solenoid valve, having exterior fittings 43 and rubber hoses 42 coupled therewith, in accordance with an embodiment of the present disclosure. The system 10 further comprises a PCB circuit relay 41 that is operatively coupled with the ESD latch valve 40. The ESD latch valve 40 is automated by way of being coupled with multiple channels set at levels specified by the user.

Figure 5:
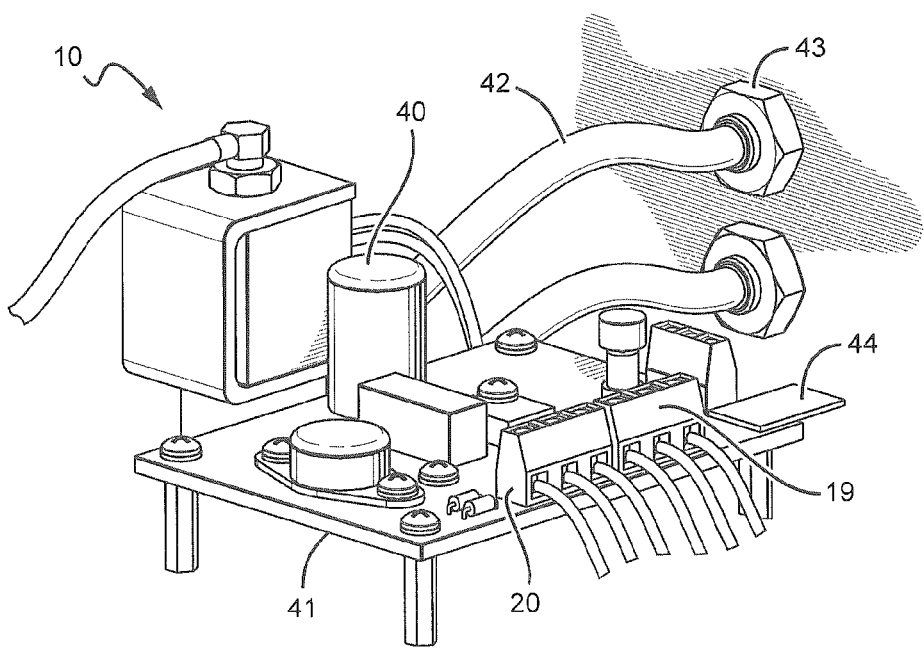
FIG. 5 is a schematic diagram illustrating a perspective view of a gas monitoring system, having an ESD latch valve, comprising a solenoid valve, and a PCB relay circuit board, having a PCB circuit relay, coupled with gas detection and alarm relays, in accordance with an embodiment of the present disclosure.

Referring to FIG. 5, this schematic diagram illustrates, in a perspective view, a gas monitoring system 10, having an ESD latch valve 40, comprising a solenoid valve, and a PCB relay circuit board, comprising a PCB circuit relay 41, coupled with gas detection relay 19 and alarm relay 20, in accordance with an embodiment of the present disclosure. The PCB circuit relay 41 is further coupled with a manual ESD reset switch 44.

Figure 6:
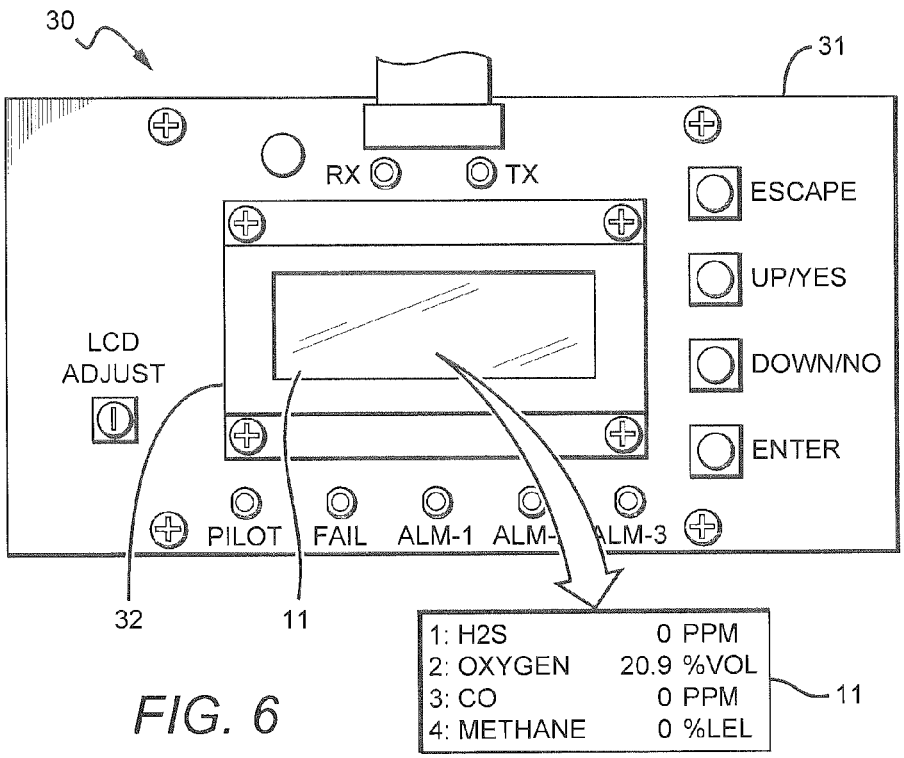
FIG. 6 is a schematic diagram illustrating an exploded view of a display over a control PCB panel, the display having an OLED display, of a gas monitoring system, in accordance with an embodiment of the present disclosure.

Referring to FIG. 6, this schematic diagram illustrates, in an exploded view, a display over a control PCB panel 30, the display 32 comprising a digital display 11, such as an LED display, e.g., an OLED display and/or an LCD display, of a gas monitoring system 10, in accordance with an embodiment of the present disclosure.

Figure 7:
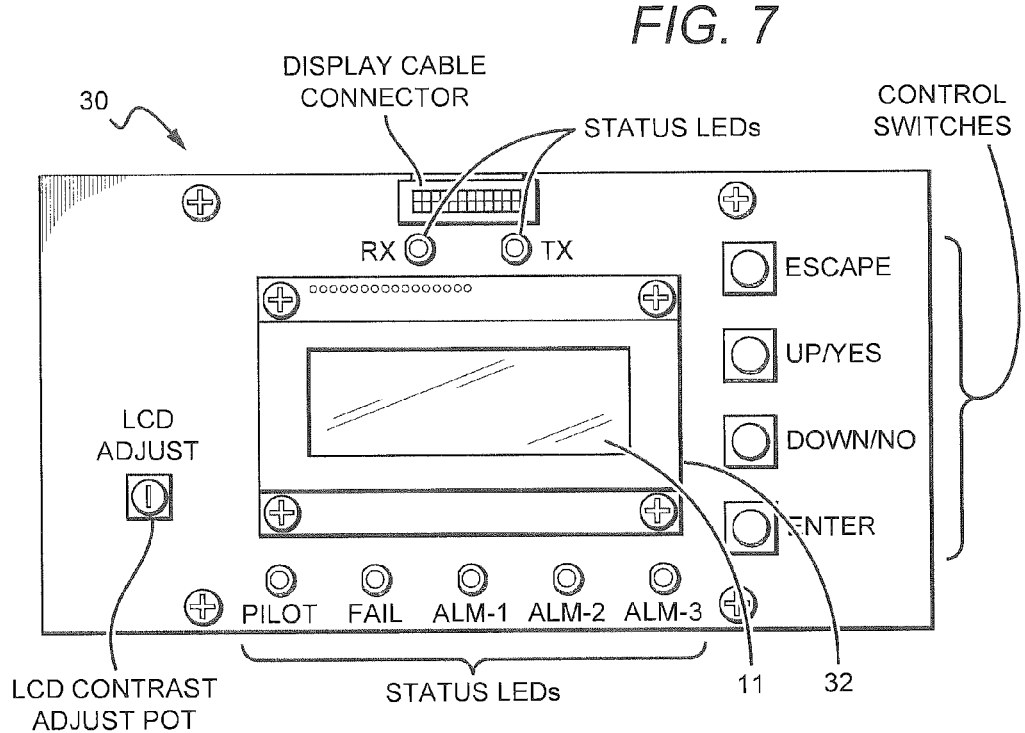
FIG. 7 is a schematic diagram illustrating an alternative top view of a display over a control PCB panel, the display having an OLED display, of a gas monitoring system, in accordance with an embodiment of the present disclosure.

Referring to FIG. 7, this a schematic diagram illustrating an alternative top view of a display 32 over a control PCB panel 30, the display 32 comprising a digital display 11, such as an LED display, e.g., an OLED display and/or an LCD display, of a gas monitoring system 10, in accordance with an embodiment of the present disclosure.

Figure 8:
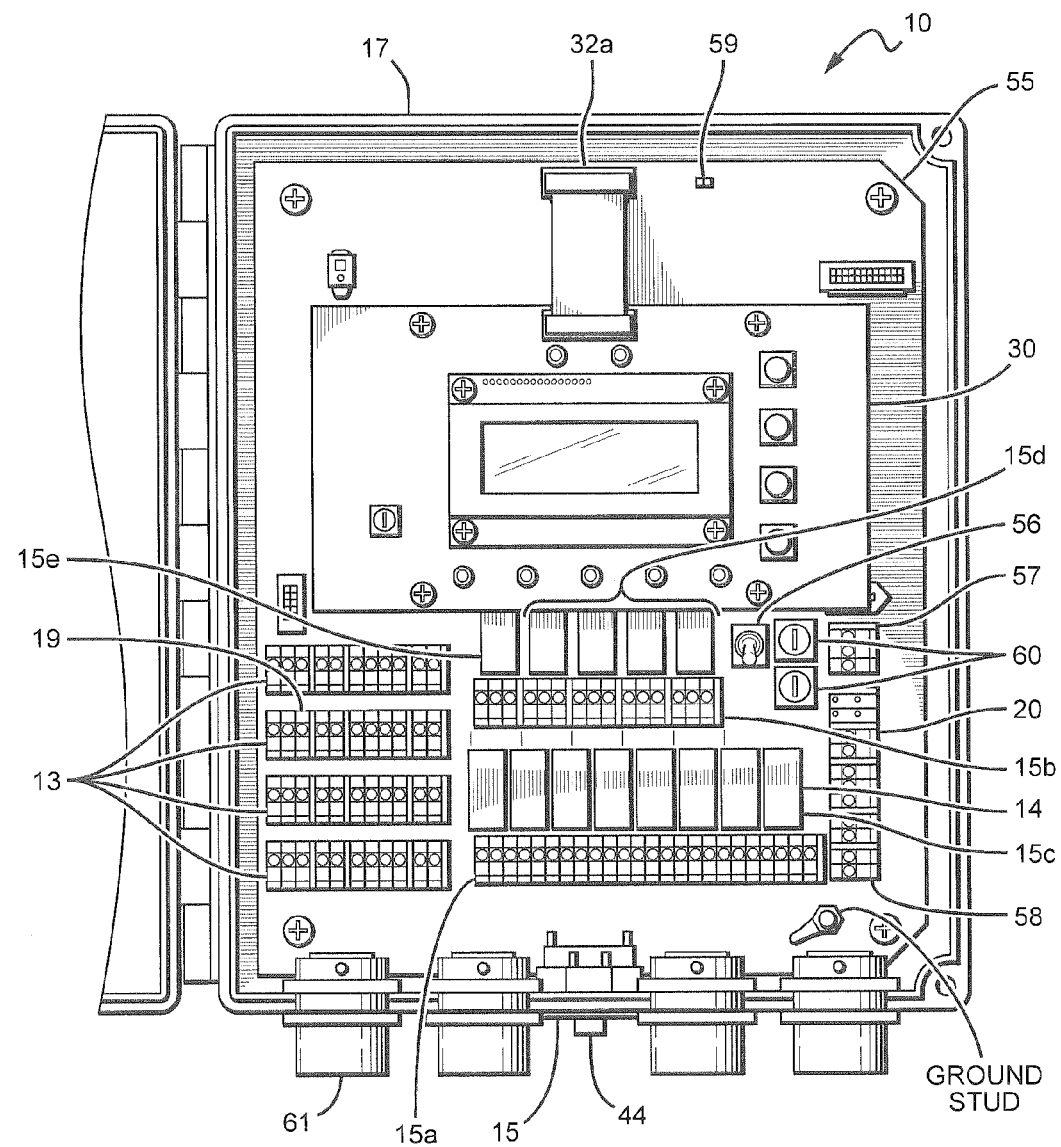
FIG. 8 is a schematic diagram illustrating an interior view of a gas monitoring system, in accordance with an embodiment of the present disclosure.

Referring to FIG. 8 is a schematic diagram illustrating an interior view of a gas monitoring system 10, comprising a control PCB panel 30 having a display 32 comprising a digital display 11, such as an LED display, e.g., an OLED display and/or an LCD display; a main PCB 55 in communication with the control PCB panel 30; and a housing 17 for accommodating the panel 30 and the PCB 55, in accordance with an embodiment of the present disclosure. The control PCB panel 30 is coupled with a display cable 32a. The main PCB 55 is in communication with a PCB circuit relay 41, a gas detection relay 19, and an alarm relay 20, a Modbus transmitter (digital or analog) 13 rated in a range of approximately 4 mA to approximately 20 mA, a plurality of 4-channel relays 14, and a transmitter (digital or analog) 21 rated in a range of approximately 4 mA to approximately 20 mA. The main PCB 55 is in further communication with a reset switch 44, a buzzer 15, a channel arm terminal strip 15a, a common channel arm terminal strip 15b, a power switch 56, an AC IN terminal strip 57, a controller terminal strip 58, a conduit hub 61, AC fuses 60, and a conduit hub 61. Additionally, any other 4-mA to 20-mA transmitter, operating up to 38.4 k baud, used with any of a meteorological software, a Fire-Eye® platform, a photo-ionization detector (PID), and a web-camera, and the like, in the system 10 provides full coverage detection.

Still referring to FIG. 8, the system 10 offers several special features that are unique in gas detection and monitoring. The four channel controller is configured for low temperature applications, e.g., the Dakotas, Montana, and Alberta. The Modbus has also been accelerated to 38.4 k baud, thereby providing faster communication at greater distances. The ESD latch valve 40 is directly connected to the multiple channels for facilitating rapid remote and automatic response to a crisis condition. The ESD latch valve 40 may be configured as explosive-proof and/or explosion-proof and may be directly connected to an inlet valve of equipment or buildings to immediately shut off gas flow. In the case of mines, the ESD can alternatively be connected to the mine ventilation system or to the mine's fire preparedness and response program.

Figure 9:
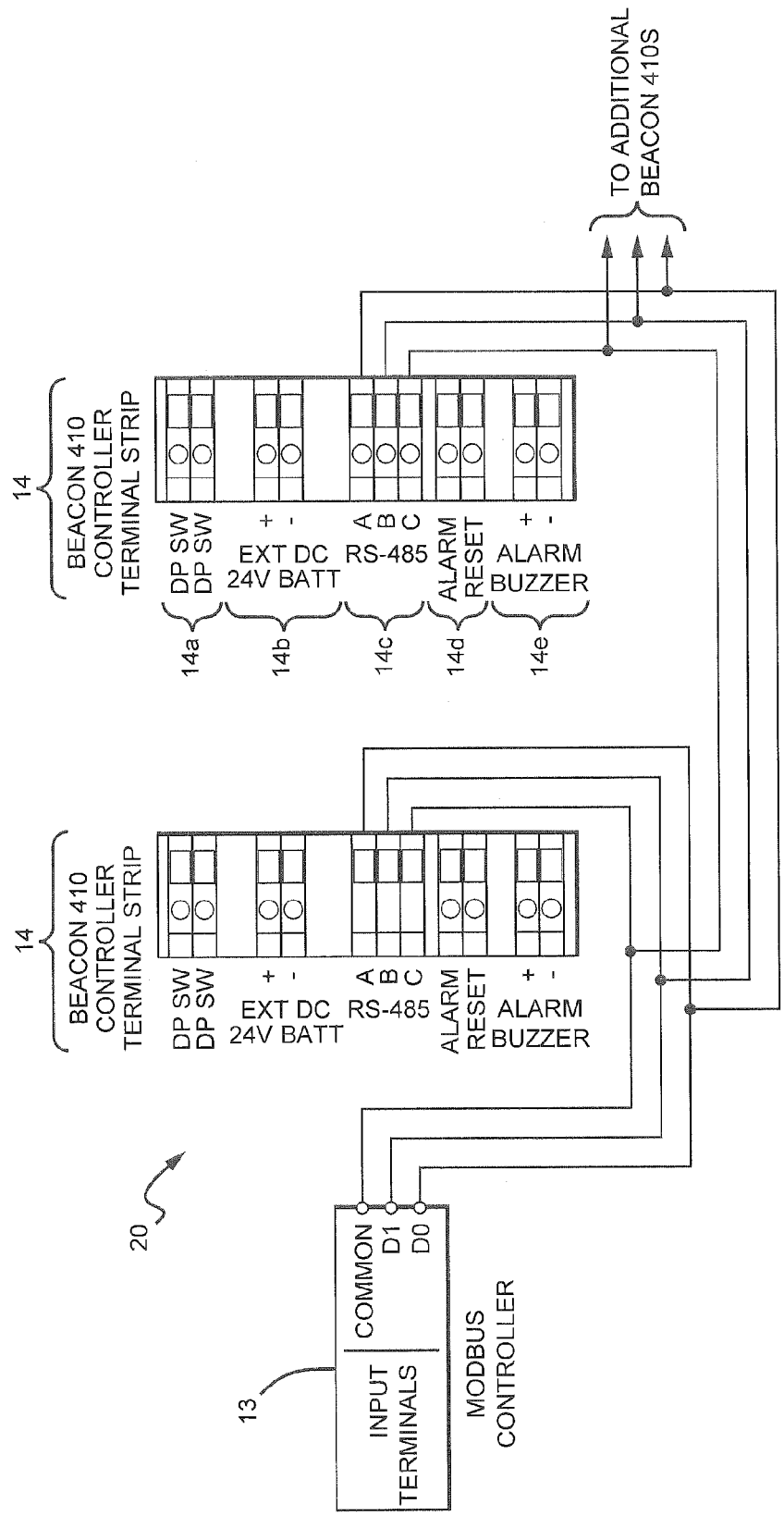
FIG. 9 is a schematic circuit diagram illustrating a preferred wiring configuration for a Modbus transmitter of a gas monitoring system, in accordance with an embodiment of the present disclosure.

Referring to FIG. 9, this schematic circuit diagram illustrates, a preferred wiring configuration for a transmitter relay 20, comprising a transmitter (digital or analog) 21, such as a Modbus transmitter 13, and a plurality of 4-channel relays 14, of a gas monitoring system 10, the transmitter relay 20 configured to receive signals from a plurality direct sensors 12, in accordance with an embodiment of the present disclosure. The direct-connect sensors 12 comprise at least one of an electro-chemical sensor, catalyst sensor, and an infrared sensor. Each relay 14 of the plurality of 4-channel relays 14 comprises a flow switch 14a, an external DC contact 14b, an RS-485 contact 14c, an alarm reset contact 14d, and an alarm buzzer contact 14e. Each relay 14 of the plurality of 4-channel relays 14 are serially disposed in relation to one another and serially connected to the Modbus transmitter 13.

Still referring to FIG. 9, the system 10 comprises a 2-wire Modbus RTU device. When wiring the system 10, using the Modbus-Over-Serial-Line Specification and Implementation Guide V1.0 or later is preferred. This Modbus protocol supports a maximum of 247 unique slave addresses (1-247). The system's 10 line driver provides for up to 32 gas monitoring devices (or some combination of gas monitoring devices and other Modbus slave devices) to be connected together without the need for a repeater. If more than 32 gas monitoring devices (or gas monitoring devices and other slave devices) need to be connected together, an RS-485 repeater(s) should be used such that no more than 32 AEGIS 400s reside on any given network segment. The MODBUS terminals are located on the controller terminal strip.

Figure 10:
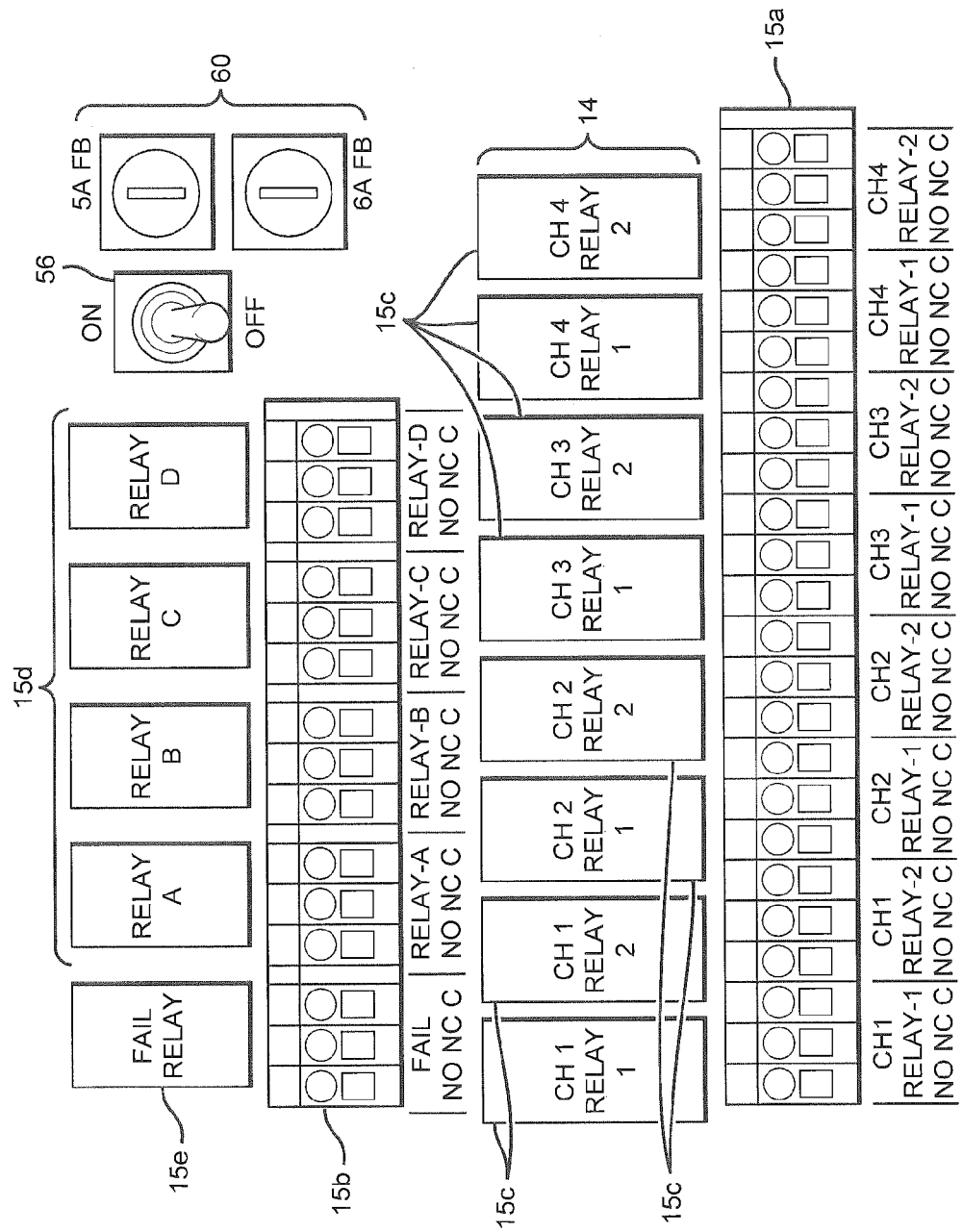
FIG. 10 is a schematic diagram illustrating a preferred relay allocation for a beaconing feature of a gas monitoring system, in accordance with an embodiment of the present disclosure.

Referring to FIG. 10, this schematic diagram illustrates, in a circuit diagram, a preferred relay allocation for a beaconing feature of a gas monitoring system 10, wherein the preferred relay allocation comprises a channel alarm terminal strip 15a, a common channel alarm terminal strip 15b, channel relays 15c, common channel relays 15d, a fail relay 15e, a power switch 56, and AC fuses 60, in accordance with an embodiment of the present disclosure. The system 10 includes eight channel relays and one common fail relay. The system 10 also includes four common/channel relays that are factory defined as common relays. All the relays have single-pole double-throw (SPDT) contacts, also known as form C contacts, and are rated for 10 amps at 115 VAC (resistive). The contacts are available at the channel alarm and common/channel alarm terminal strips and are labeled NO (normally open), NC (normally closed), and C (common).

Figure 11:
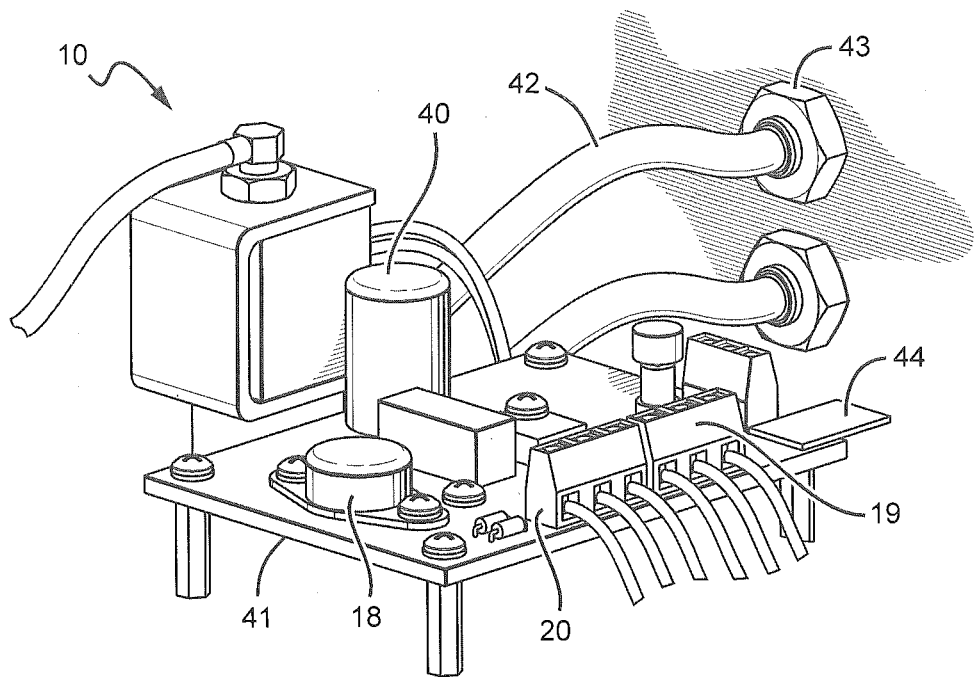
FIG. 11 is a schematic diagram illustrating a perspective view of a gas monitoring system, having an ESD latch valve, comprising a solenoid valve, and a PCB relay circuit board or control PCB panel coupled with gas detection and alarm relays as well as an ESD circuit relay, in accordance with an embodiment of the present disclosure.

Referring to FIG. 11, this schematic diagram illustrates, in a close-up perspective view, a gas monitoring system 10, having an ESD latch valve 40, comprising a solenoid valve, and a ESD circuit relay or PCB circuit relay 41 (a PCB relay circuit board) coupled with a gas detection relay 19, an alarm relay 20, an ESD circuit relay, in accordance with an embodiment of the present disclosure.

Figure 12:
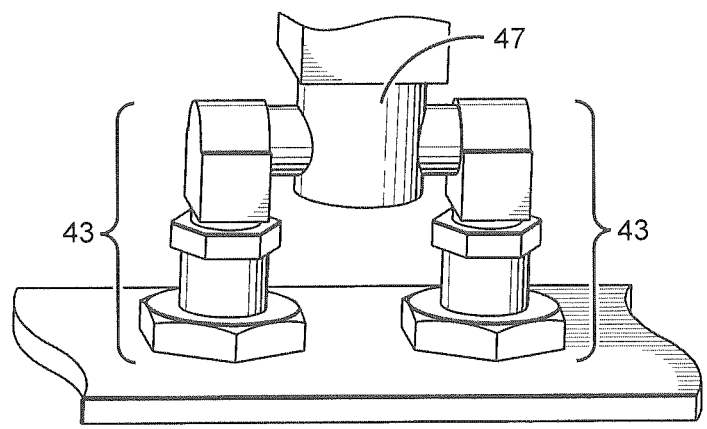
FIG. 12 is a schematic diagram illustrating a perspective view of fittings, such as brass fittings, for the ESD device adapted to couple with exterior gas inlets of a gas monitoring system, in accordance with an embodiment of the present disclosure.

Referring to FIG. 12, this schematic diagram illustrates, in a close-up perspective view, fittings 43, such as brass fittings, for the ESD device 40 adapted to couple with exterior gas inlets 46 of a gas monitoring system 10, in accordance with an embodiment of the present disclosure.

Figure 13:
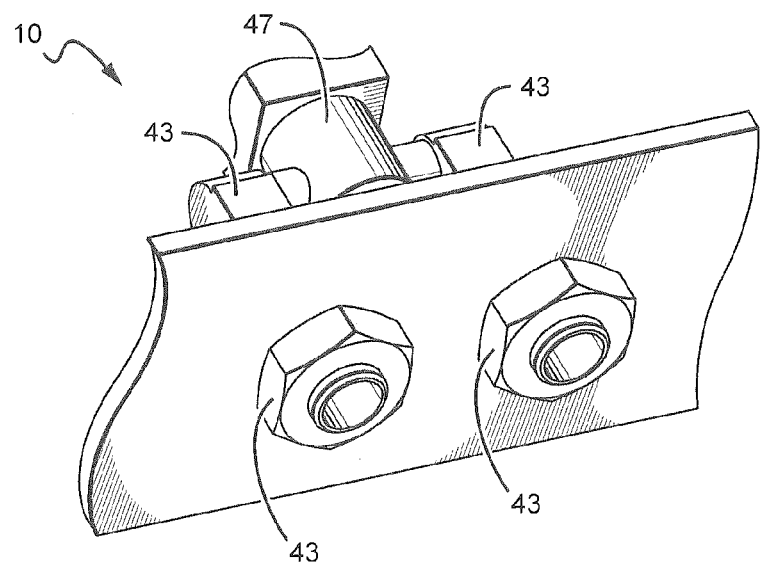
FIG. 13 is a schematic diagram illustrating a side view of fittings, such as brass fittings, for the ESD device adapted to couple with exterior gas inlets of a gas monitoring system, in accordance with an embodiment of the present disclosure.

Referring to FIG. 13, this schematic diagram illustrates, in a side view, fittings 43, such as brass fittings, for the ESD device 40 adapted to couple with exterior gas inlets 46 of a gas monitoring system 10, in accordance with an embodiment of the present disclosure.

Figure 14:
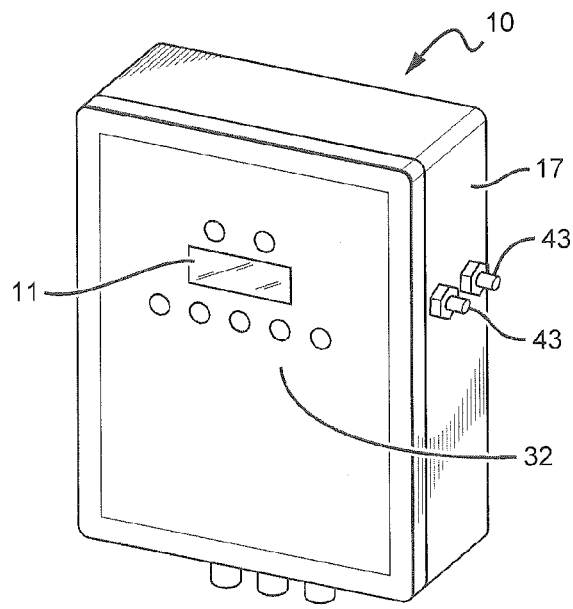
FIG. 14 is a schematic diagram illustrating a perspective view of a gas monitoring system, comprising a housing, such as a weather-proof enclosure, a control PCB panel having an OLED display being visible; and brass fittings of the ESD device, in accordance with an embodiment of the present disclosure.

Referring to FIG. 14, this schematic diagram illustrates, in a perspective view, a gas monitoring system 10, comprising a housing 17, such as a weather-proof enclosure, a control PCB panel 41 having a display 11 being visible; and fittings 43, such as brass fittings, of the ESD device 40, in accordance with an embodiment of the present disclosure.

Figure 15:
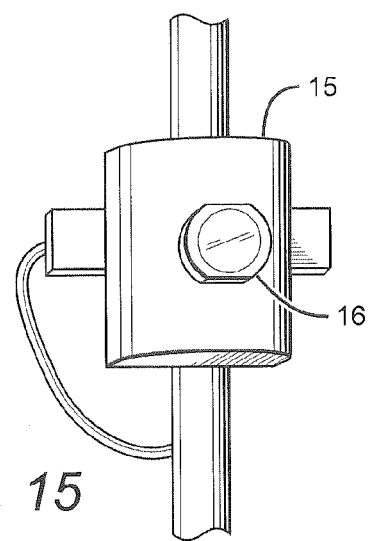
FIG. 15 is a schematic diagram illustrating a front view of an LED strobe light, such as a red LED strobe light, for an OLED display of a gas monitoring system, in accordance with an embodiment of the present disclosure.

Referring to FIG. 15, this schematic diagram illustrates, in a front view, an LED strobe light, such as a red LED strobe light 16, and an audible alarm 15, for a display 11 of a gas monitoring system 10, in accordance with an embodiment of the present disclosure.

Figure 16:
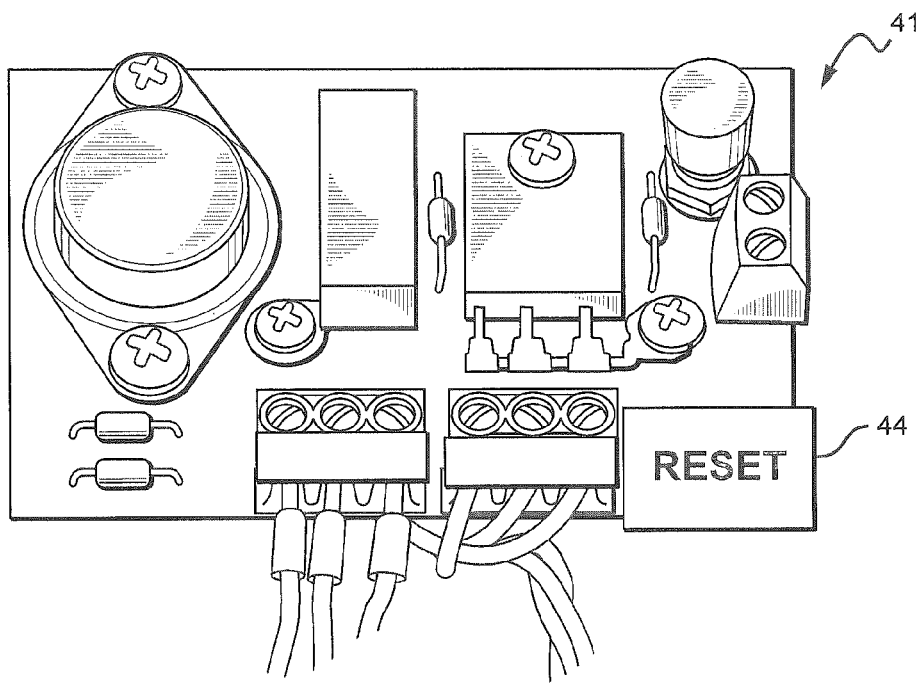
FIG. 16 is a schematic diagram illustrating a top perspective view of PCB relay circuit board or a control PCB panel, having an ESD circuit relay with manual reset switch, of a gas monitoring system, in accordance with an embodiment of the present disclosure.

Referring to FIG. 16, this schematic diagram illustrates, in a top perspective view, a PCB relay circuit board or a control PCB panel with an ESD circuit relay 41 and manual reset switch 44, of a gas monitoring system 10, in accordance with an embodiment of the present disclosure.

Figure 17:
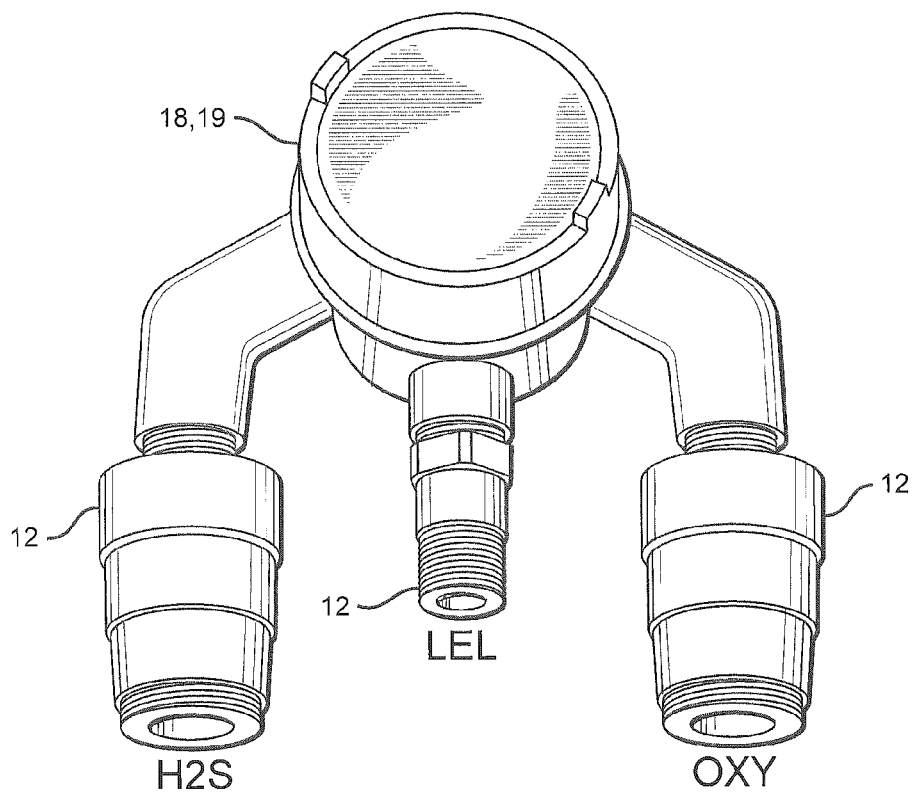
FIG. 17 is a schematic diagram illustrating a perspective view of a sensor assembly in a tri-head configuration, comprising a remote slave sensor, in a Class, Div 1, enclosure, coupled with three direct-connect sensors, of a gas monitoring system, in accordance with an embodiment of the present disclosure.

Referring to FIG. 17, this schematic diagram illustrates, in a perspective view, a sensor assembly in a tri-head configuration, comprising a remote slave sensor 18, disposed in a Class 1 Div. 1, enclosure, coupled with three direct-connect sensors 12, of a gas monitoring system 10, in accordance with an embodiment of the present disclosure. For those Class I, Div. 1, zones, an explosion proof housing, e.g., comprising a cast aluminum material with epoxy coating, accommodates three (3) sensors 12 as part of the system 10. The sensors 12 enable "plug & play" usage and can either be IR, catalytic or electro-chemical sensors, depending upon the relative circumstances and conditions of each site. Replacing a sensor 12 is as simple as unscrewing a sensor housing, removing the old sensor, replacing it with a new sensor, and recalibrating the system 10. The system 10 will indicate when sensors begin to drift recalibrating the sensors into service requires only a short period of time, such as ~15-20 minutes.

Figure 18A:
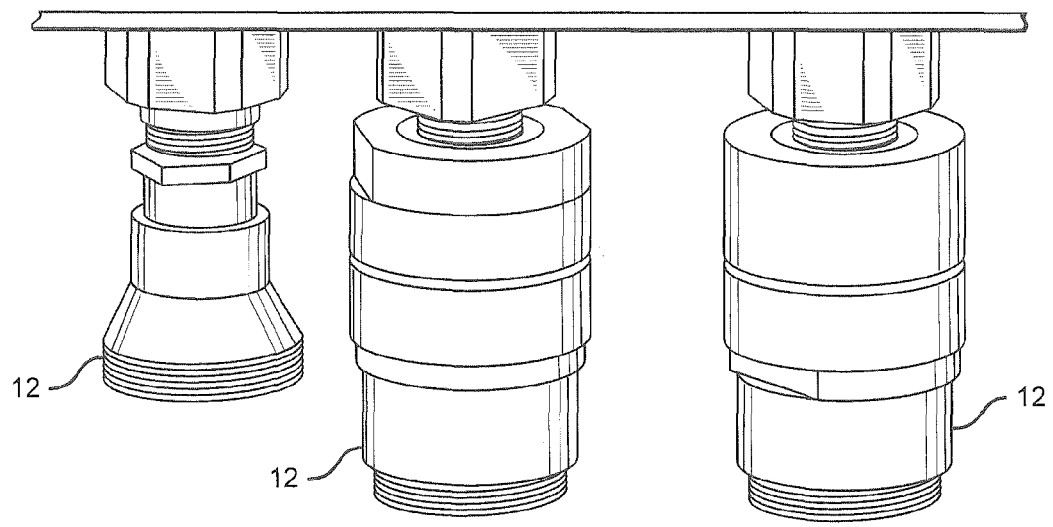
FIG. 18A is a schematic diagram illustrating a frontal perspective view of a sensor assembly in a tri-head configuration, comprising three direct-connect sensors, of a gas monitoring system, in accordance with an embodiment of the present disclosure.

Referring to FIG. 18A, this schematic diagram illustrates, in a frontal perspective view, three direct-connect sensors 12 in a tri-head configuration of a sensor assembly, of a gas monitoring system 10, in accordance with an embodiment of the present disclosure.

Figure 18B:
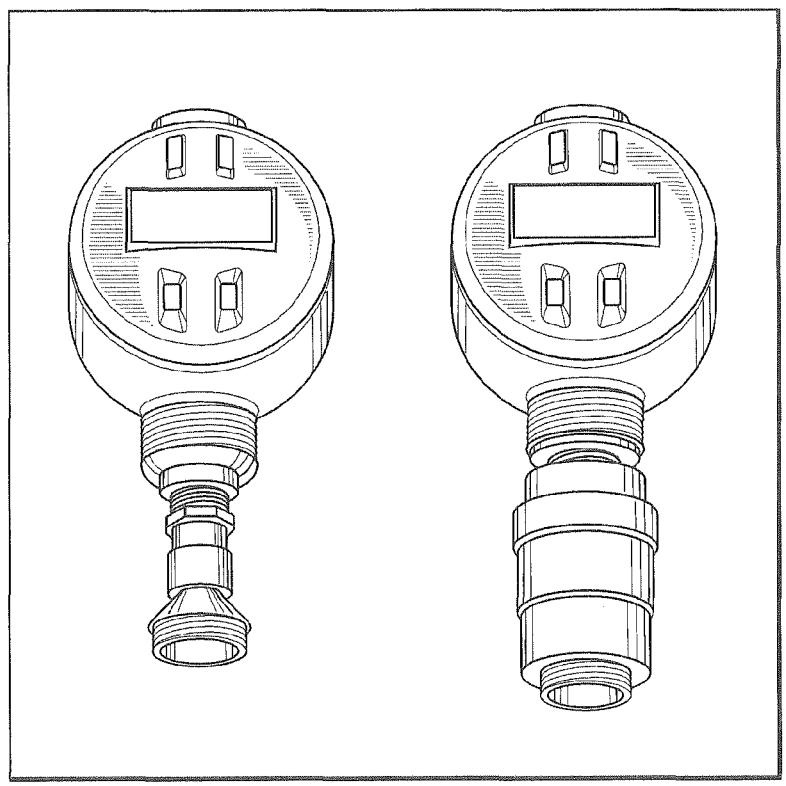
FIG. 18B is a schematic diagram illustrating a frontal perspective view of two direct-connect sensors in an individual configuration, of a gas monitoring system, in accordance with an embodiment of the present disclosure.

Referring to FIG. 18B, this schematic diagram illustrates, in a frontal perspective view, two direct-connect sensors 12, such as Class I, Div. two (2) S2 sensors, in an individual configuration, of a gas monitoring system 10, in accordance with an embodiment of the present disclosure.

Figure 19:
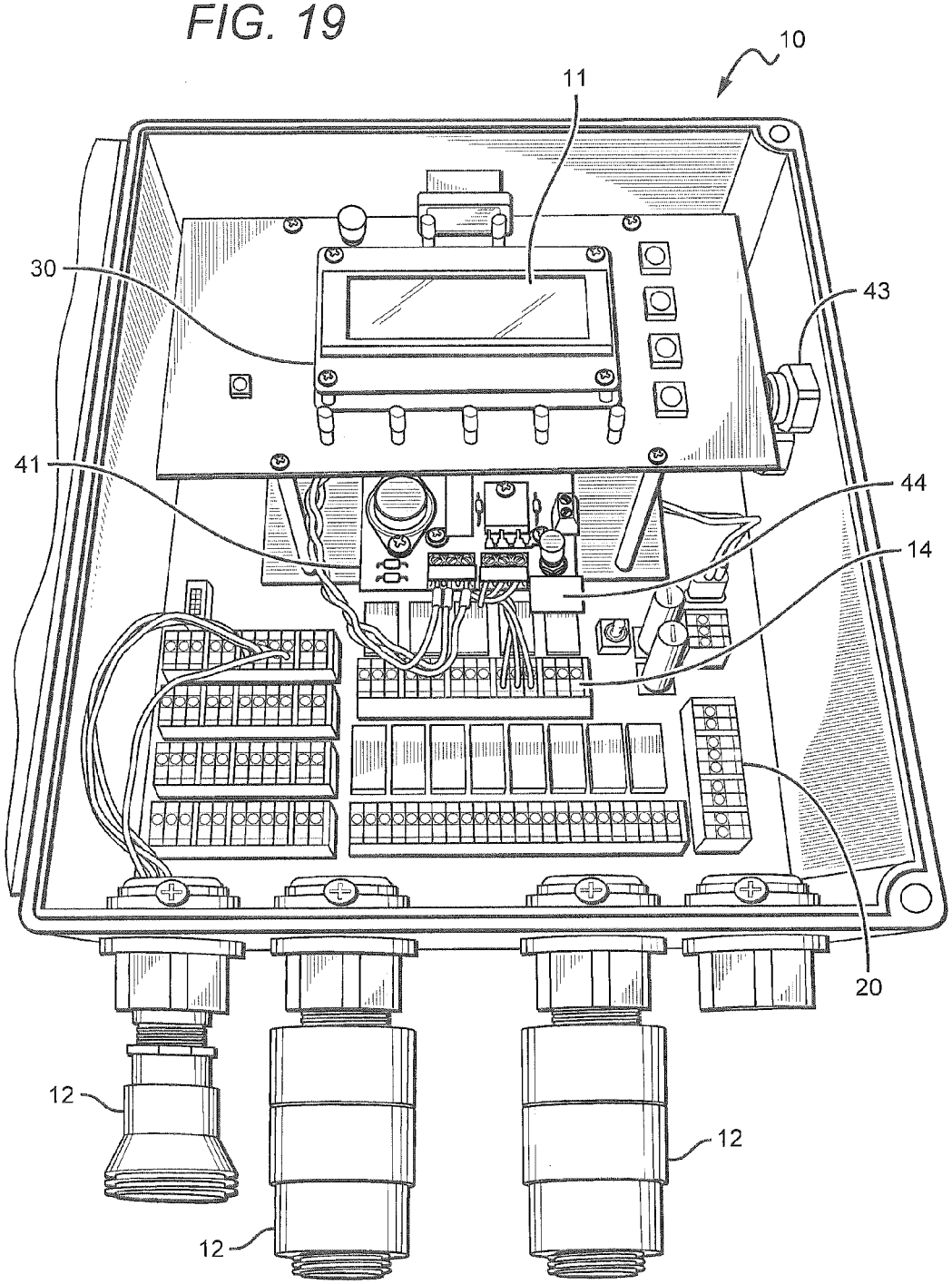
FIG. 19 is a schematic diagram illustrating an interior view of a gas monitoring system, comprising an ESD device, brass fittings, an ESD PCB circuit relay, a manual ESD reset switch, an OLED control display, 4-channel relays, and direct-connect sensors, in accordance with an embodiment of the present disclosure.

Referring to FIG. 19, this schematic diagram illustrates in an interior view, a gas monitoring system 10, comprising an ESD device 40, fittings 43, e.g., brass fittings, an ESD PCB circuit relay 42, a manual ESD reset switch 44, a display 30 having an OLED control display 11 by example only, 4-channel relays 14, an alarm relay 20, and direct-connect sensors 12, in accordance with an embodiment of the present disclosure.

Figure 20:
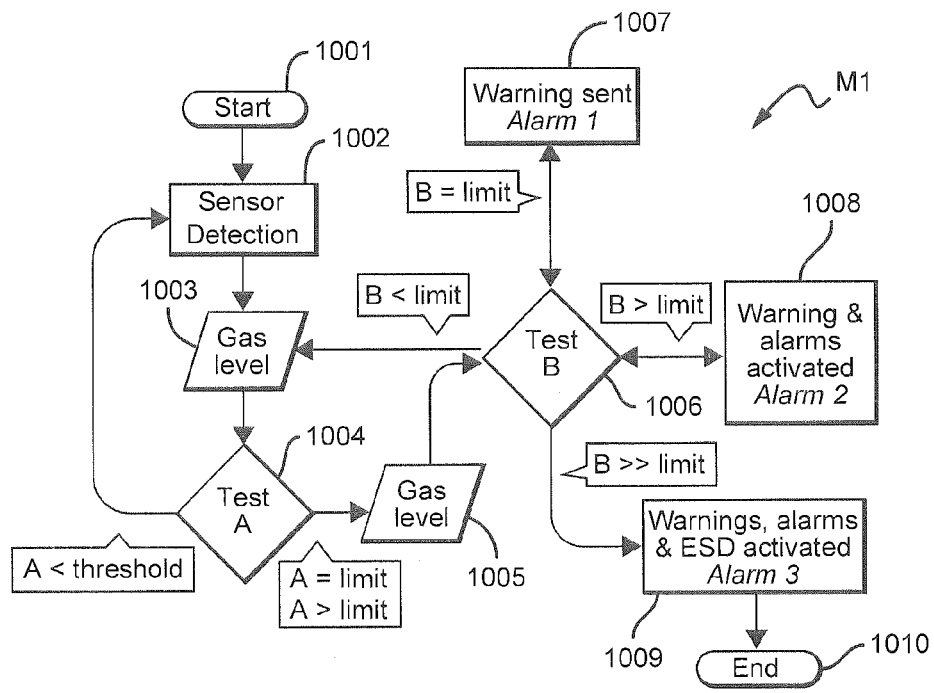
FIG. 20 is a flowchart illustrating a method of operating a gas monitoring system, the operating method comprising employing three alarm levels and handling their responses, in accordance with an embodiment of the present disclosure.

Referring to FIG. 20, this flowchart illustrates a method M1 of operating a gas monitoring system 10, the operating method M1 generally comprising employing three alarm levels and handling their responses, in accordance with an embodiment of the present disclosure. The method M1 of operating a gas monitoring system 10 comprises: commencing operation by powering a gas monitoring system 10, as indicated by block 1001; sensing a gas level by way of at least one direct-connect sensor 12, as indicated by block 1002; determining the gas level using data obtained by the at least one direct-connect sensor 12, as indicated by block 1003; determining whether the gas level is less than a threshold value, as indicated by block 1004; if the gas level is less than the threshold value, sensing a gas level by way of at least one direct-connect sensor 12, as indicated by block 1002, and if the gas level is at least the threshold value, proceeding to performing a limit test, as indicated by block 1005, and performing the limit test, as indicated by block 1006; if the gas level is less than the limit, determining the gas level using data obtained by the at least one direct-connect sensor 12, as indicated by block 1003, if the gas level is equal to the limit, sending a warning by way of a first alarm feature, as indicated by block 1007, if the gas level exceeds the limit, sending a warning and activating an alarm by way of a second alarm feature, as indicated by block 1008, if the gas level greatly exceeds the limit, e.g., by a predetermined value, sending a warning, activating an alarm, and activating an ESD latch valve 40 by way of a third alarm feature, as indicated by block 1009, and terminating operation of the gas monitoring system 10, as indicated by block 1010, in accordance with an embodiment of the present disclosure.

Figure 21:
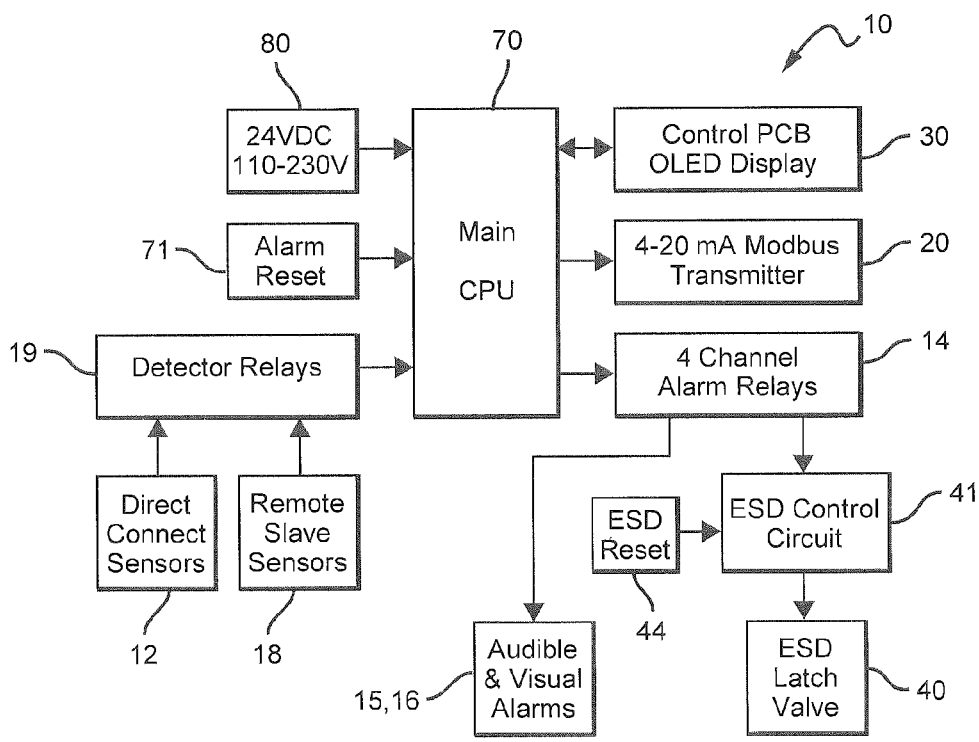
FIG. 21 is a block diagram illustrating the general configuration of a gas monitoring system, in accordance with an embodiment of the present disclosure.

FIG. 21 is a block diagram illustrating the general configuration of a gas monitoring system 10, generally comprising: a processor 70, such as a main central processing unit; and an ESD latch valve 40 operatively coupled with the processor 70, in accordance with an embodiment of the present disclosure. The system 10 is configured for powering by a power source 80, such as a 24 VDC, 100 V to 230 V power source. The system 10 further comprises a plurality of detector relays 19 configured to receive signals from at least one of at least one direct-connect sensor 12 and at least one remote slave sensor 18, the plurality of detector relays 19 in communication with the processor 70. The system 10 further comprises: a display feature 30, such as a control PCB OLED display, in bidirectional communication with the processor 70; a Modbus transmitter 20 in communication with the processor 70; and a 4-channel alarm relay 14 in communication with the processor 70. The system 10 further comprises at least one of an audible alarm 15 and a visual alarm 16 activable by the 4-channel alarm relay 14. The system 10 further comprises an ESD control circuit 41 responsive to an ESD reset feature 44 and configured to activate the ESD latch valve 40 in response to instructions from the processor 70.

Figure 22:
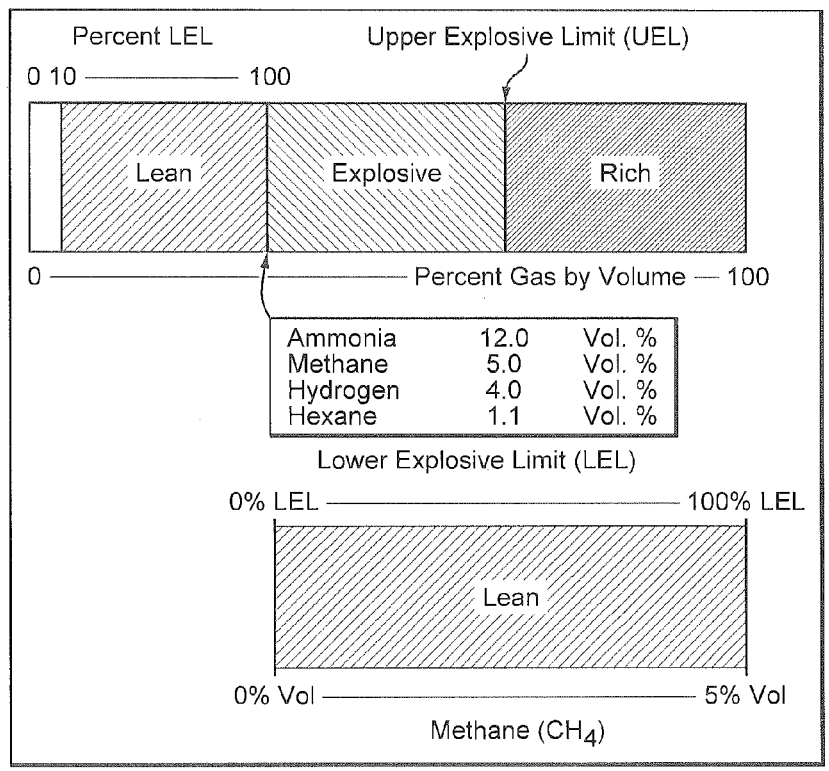
FIG. 22 is a diagram illustrating the flammability band in terms of volume % that is considered in operating the gas monitoring system for monitoring at least one gas, in accordance with an embodiment of the present disclosure.

Referring to FIG. 22, this diagram illustrates the flammability band in terms of volume % is considered in operating the system 10 for monitoring at least one gas, such as ammonia ($NH_3$), methane ($CH_4$), hydrogen ($H_2$), and hexane ($C_6H_{14}$), wherein the flammability band ranges from a lower explosive limit (LEL) to an upper explosive limit (UEL), in accordance with an embodiment of the present disclosure.

Figure 23:
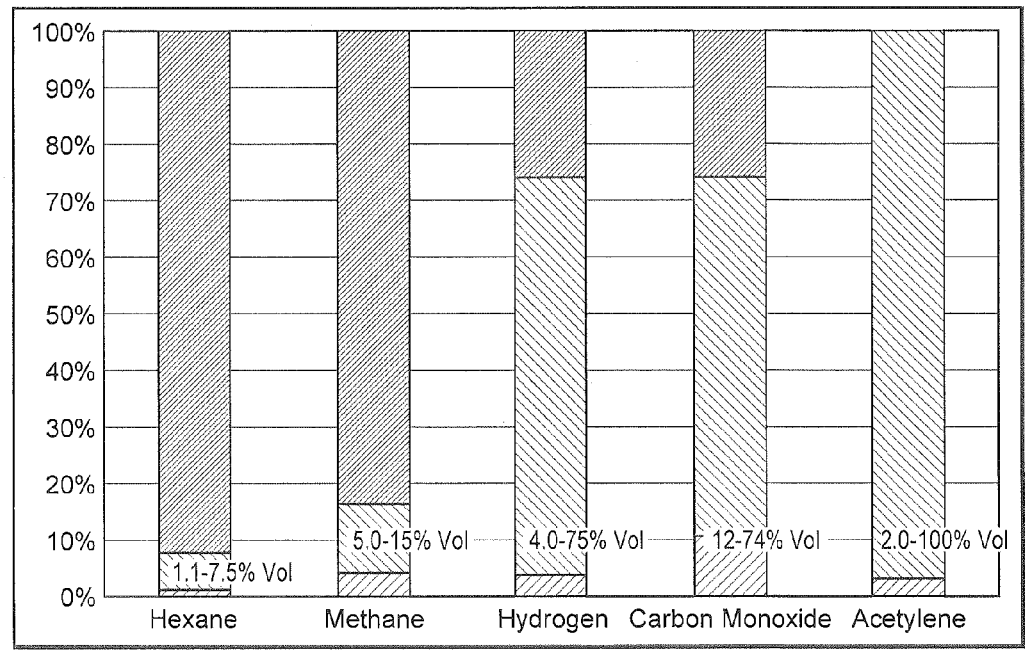
FIG. 23 is bar graph illustrating the lower explosive limit (LEL) that is considered in operating the gas monitoring system for monitoring at least one gas, in accordance with an embodiment of the present disclosure.

Referring to FIG. 23, this bar graph illustrates the lower explosive limit (LEL) that is considered in operating the system 10 for monitoring at least one gas, such as ammonia ($NH_3$), methane ($CH_4$), hydrogen ($H_2$), and hexane ($C_6H_{14}$), in accordance with an embodiment of the present disclosure. This lower explosive limit (LEL) is also denoted as the Lower Flammable Limit (LFL) which is defined as the minimum concentration of gas or vapor mixed with air that will cause the propagation of flame when it comes in contact with a source of ignition (spark or flame). Concentrations of gas below the LEL are too lean to ignite.

Figure 24:
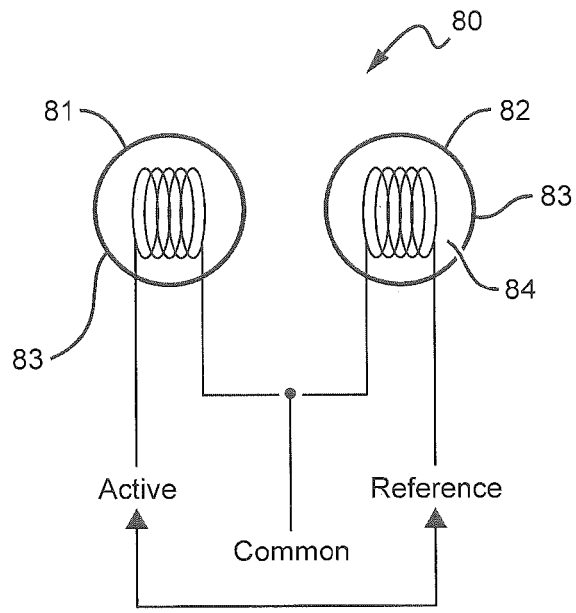
FIG. 24 is a schematic diagram illustrating a constant voltage catalytic bead sensor, in accordance with an embodiment of the present disclosure.

Referring to FIG. 24, this schematic diagram illustrates a constant voltage catalytic bead sensor 80, generally comprising a platinum catalyst 81 acting as an active element; and deactivator 82 having a platinum alloy wire 84 acting as a reference element, the active element and the reference element sharing a common ground, and the active element and the reference element each having a ceramic coating 83, in accordance with an embodiment of the present disclosure. The active catalyst reacts in the presence of a defined gas, thereby sending an instant electric signal to the processor 70 of the system 10.

Figure 25:
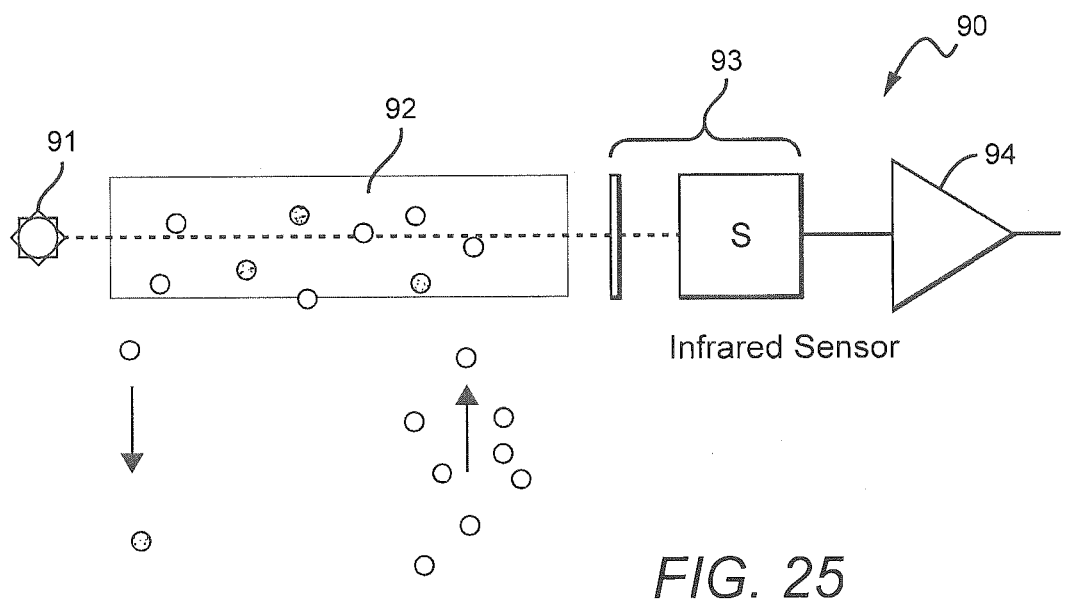
FIG. 25 is a schematic diagram illustrating an infrared sensor, in accordance with an embodiment of the present disclosure.

Referring to FIG. 25, this schematic diagram illustrates as infrared sensor 90, generally comprising a light source 91; a measuring cell 92, a band pass filter 93, and an amplifier 94, in accordance with an embodiment of the present disclosure. In conditions where the gas concentration is saturated, using an infrared sensor 90 (only in LEL) in the system 10 is preferred.

Figure 26:
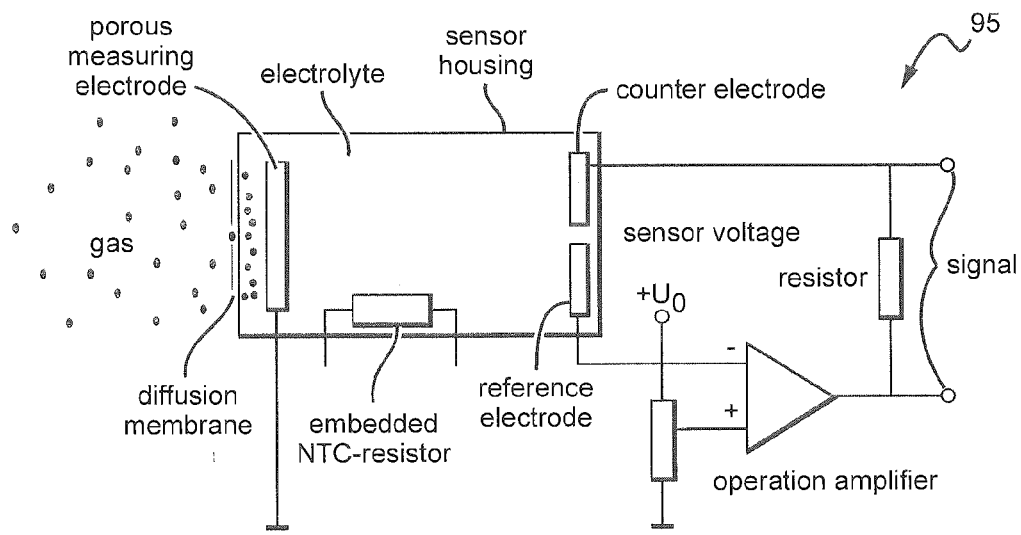
FIG. 26, is a schematic diagram illustrating an electro-chemical sensor, in accordance with an embodiment of the present disclosure.

Referring to FIG. 26, this schematic diagram illustrates an electrochemical sensor 95, wherein a gas, such as oxygen ($O_2$), creates an electrochemical reaction within the sensor 95, in accordance with an embodiment of the present disclosure.

Figure 27:
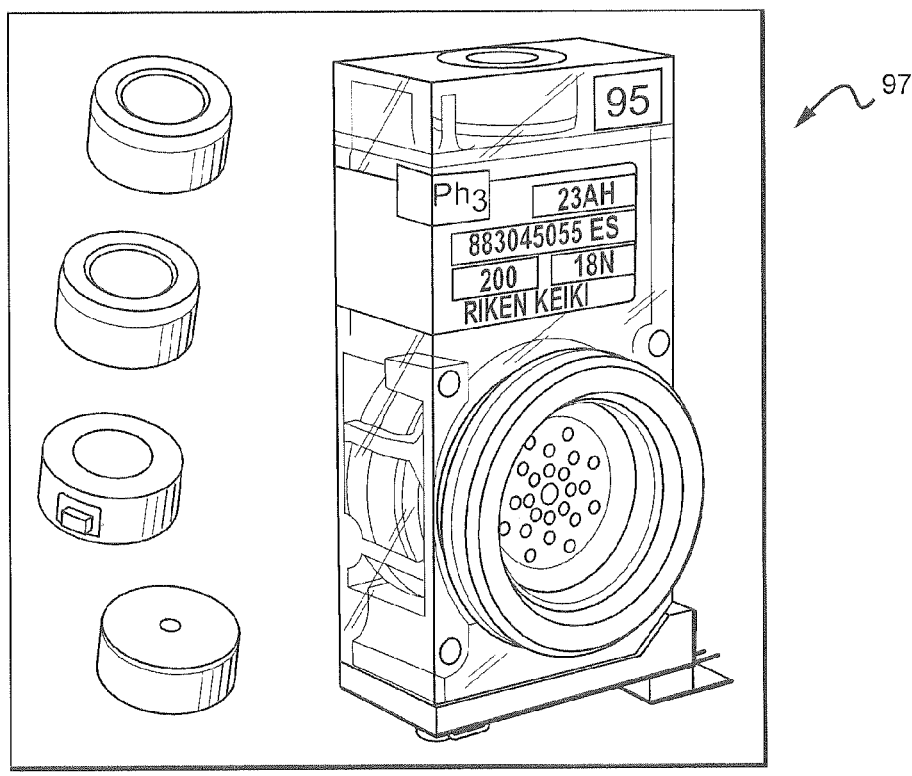
FIG. 27 is a schematic diagram illustrating an exploded perspective view of a Riken sensor, in accordance with the present disclosure.

Referring to FIG. 27, this schematic diagram illustrates, in an exploded perspective view, a Riken sensor 97, adapted for use in the system 10, in accordance with the present disclosure. The Riken sensor 97 has a long life of approximately 2+ years, a proven stability, a high degree of selectiveness, and is easy to replace and calibrate. Each Riken sensor 97 is dated and has a warranty code for enhancing reliability of the system 10 for many years.

Figure 28:
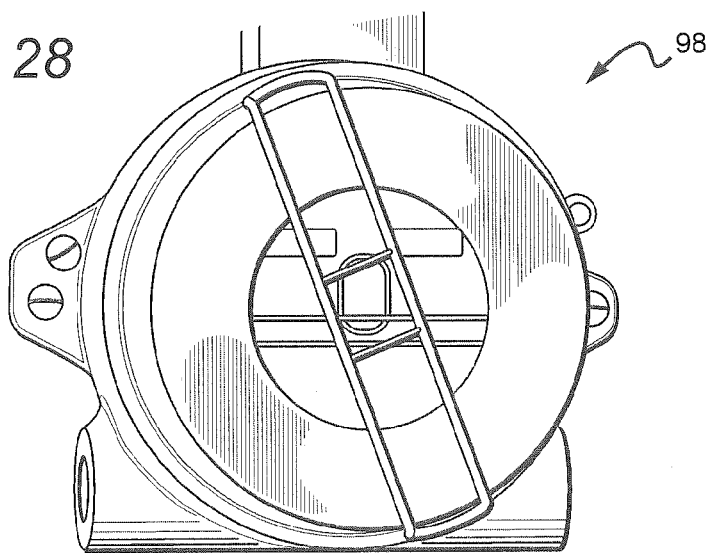
FIG. 28 is a schematic diagram illustrating a perspective view of a flame detector, in accordance with the present disclosure.

Referring to FIG. 28, this schematic diagram illustrates, in a perspective view, a flame detector 98, adapted for use in the system 10, in accordance with the present disclosure. The flame detector 98 comprises at least one component, such as a Honeywell® Flame Detector or a FireEye® for flame detection. The flame detector 98 is a multi-spectrum detector configured to sense radiant energy in the Ultraviolet (UV), Visible and Wide Band Infrared™ (WBIR) spectrum. The radiant energy from all types of flaming fires will alert the flame detector 98. The flame detector 98 comprises a cone of vision or a field-of-view of approximately 120 degrees. The flame detector 98 is optimized for the detection of ethanol, methanol, hydrogen and natural gas.

Figure 29:
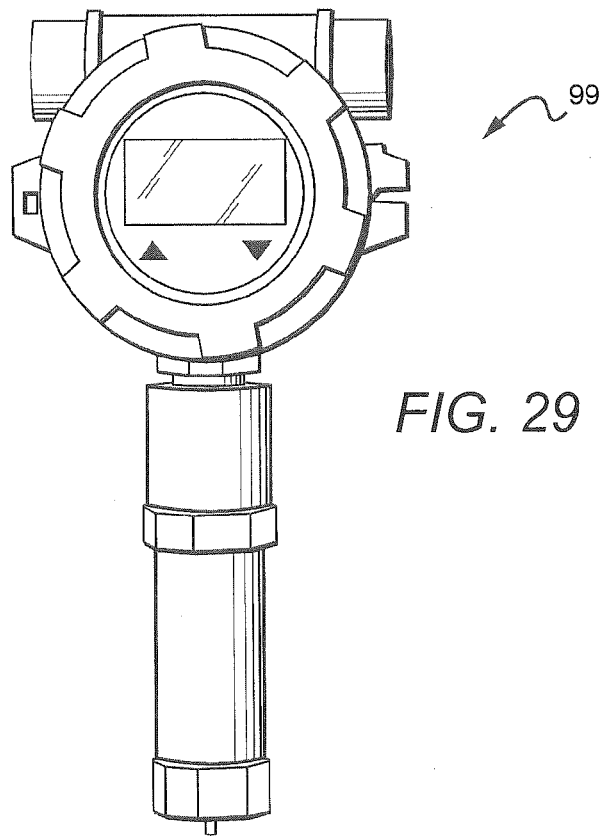
FIG. 29 is schematic diagram illustrating a front view of a photoionization detector (PID), comprising a sensor and a lamp, for detecting VOCs, in accordance with the present disclosure.

Referring to FIG. 29, this schematic diagram illustrates, in a front view, a photoionization detector (PID) 99, comprising a sensor and a lamp, for detecting VOCs, adapted for use in the system 10, in accordance with the present disclosure. The PID provides a further level of gas detection by continuously monitoring VOCs in hazardous and non-hazardous locations, thereby providing fast response times and a high accuracy readings, e.g., in a range of approximately 10 ppb to approximately 1,000 ppm. The sensor and lamp are removable without tools and are serviceable in any location, thereby facilitating calibration and maintenance.

D. Further Implementations of the Various Embodiments

1. Multiple Gas Detection and Monitoring System

The gas monitoring system 10 comprises at least one ESD latch valve 40 configured to operate on a 24 VDC or 115 VAC/230 VAC electrical system. The gas monitoring system 10 detects differing natural gases by simultaneously monitoring 1 to 4 channels (FIGS. 8 and 10). In an illustrative embodiment, the gas monitoring system 10 comprises: 4-channel relays 14; a control PCB panel 30 having a display 32 comprising a digital display 11, such as an LED display, e.g., an OLED display and/or an LCD display, configured to display data from the 4-channel relays 14 (FIG. 6), e.g., compliant with a 4-mA to 20-mA analog and/or Modbus digital output standard, a plurality of direct-connect sensors 12, such as approximately one to four electro-chemical, catalytic, infrared, or photo ionization sensors (FIG. 18); a remote slave device 18 (FIG. 17); a 4-mA to 20-mA transmitter rated in a range of approximately 4 mA to approximately 20 mA; a wire element 13, such as a 2-wire element or a 3-wire element, e.g., having baud rates up to approximately 38.4 kilobytes (FIG. 9); a plurality of alarm features configured to provide approximately three (3) programmable alarm levels per channel, the plurality of alarm features comprising at least one of a plurality of configurable alarm relays per channel, such as up to approximately three (3) configurable alarm relays per channel, an audible alarm with a silence feature, a red LED strobe light 15; a battery backup feature 16 (FIG. 15), and an alarm reset switch, a built in trouble alarm with relay, wherein the system 10 is configured to operate in a range of 115/230 VAC or 24 VDC, and wherein the system 10 further comprises a weatherproof enclosure 17, such as an NEMA 4× enclosure. Additionally, the gas monitoring system 10 is configured to use either direct sensing via sensors 12 or slave sensing via slave devices 18 in or around a detection zone.

In an alternative illustrative embodiment, the gas monitoring system 10 is a fixed-mounted, multiple-channel, continuous-monitoring control system, capable of at least one of detecting gases at up to approximately four locations and detecting four different types of gases. The gas monitoring system 10 is housed in an enclosure 17, such as a NEMA 4× and a Class 1, Div. 1, enclosure (FIG. 14). The display 32, comprising a digital display 11, such as an LED display, e.g., an OLED display and/or an LCD display, simultaneously displays the gas readings of all active channels (FIGS. 6, 7, and 21). The display screen 11 comprises a programming interface in relation to the main CPU, such as a processor 70, the programming interface configured to set calibration and alarm levels. The plurality of direct-connect sensors 12 comprise both direct-connect (internal amplifier type) detector heads (FIG. 18) and further comprises 4-mA to 20-mA transmitter (remote amplifier type) detector heads (FIG. 17). The plurality of alarm features comprises audible alarms 15 and visual alarms 16 (FIGS. 15 and 21) for providing warning of hazardous gas conditions and the 4-channel relays 14 having a plurality of alarm circuits for providing up to three levels of gas alarms (FIGS. 8, 10, and 20), plurality of alarm circuits comprising a "fail" circuit for alerting a processor 70 by way of the plurality of direct-connect sensors 12, e.g., through the detector heads or a gas monitoring element.

In an alternative illustrative embodiment, the control PCB panel 30 having a display 32 comprising a digital display 11, such as an LED display, e.g., an OLED display and/or an LCD display (FIGS. 6, 7 and 21), has four selection menus for facilitating configuring various channel and instrument parameters, such as at least one of a global menu, a configuration menu, an input setup menu, and a Modbus menu by a user (FIGS. 6, and 20). The control PCB panel 30 having a display 32 comprising a digital display 11, such as an LED display, e.g., an OLED display and/or an LCD display, further comprises at least one additional selection feature of an operational mode feature and a calibration mode feature for facilitating calibrating the monitor's active channels, e.g., by a user. The control PCB panel 30 having a display 32 comprising a digital display 11, such as an LED display, e.g., an OLED display and/or an LCD display, is further adapted to operate under inclement weather conditions, such as cold-weather conditions in combination with an ESD latch valve 40 to overcome many of the problems experienced in the related art. The control PCB panel 30 having a display 32 comprising a digital display 11, such as an LED display, e.g., an OLED display and/or an LCD display, is further adapted to operate under inclement weather conditions, such as cold-weather conditions, by way of a weather-proof enclosure 17, such as an NEMA 4× or a Class 1, Div. 1, enclosure.

2. Modbus Transmitter Relay (4-mA to 20-mA)

The gas monitoring system 10 in configured to simultaneously monitor up to 4 channels with remote logging of data via a digital Modbus network using a Modbus transmitter relay. The 4-mA to 20-mA Modbus Transmitter Relay is compliant with a 4-20 mA analog & Modbus digital output standard and operates at 2400, 4800, 9600, 19,200, and 38,400 baud. The gas monitoring system 10 is also configured to employ a 2- or 3-wire 4-mA to 20-mA a Modbus transmitter 13, such as a Modbus remote terminal unit (RTU) device having a 4-mA to 20-mA transmitter 21 (digital or analog) (FIGS. 8 and 9); and the Modbus protocol supports a maximum of approximately two-hundred forty-seven (247) unique slave addresses (1-247). The gas monitoring system 10 further comprises a line driver enables up to thirty-two (32) monitors or sensors 12 (FIG. 18) or some combination of monitors or sensors 12 and other Modbus slave devices 18 (FIGS. 17 and 20) coupled together without the need for a repeater. The Modbus transmitters 13 are disposed on a controller terminal strip. (FIGS. 9 and 21). The Modbus transmitter relay 20 enables up to approximately thirty-two (32) monitors or sensors 12 (or some combination of monitors or sensors 12 and other Modbus slave devices 18) to be coupled together without the need for a repeater. The 4-mA to 20-mA Modbus transmitter 13 can be digital or analog and is adapted for connection with a wireless network, such as a scada and a telemetry system.

3. Display Features

A control PCB panel 30 has a display 32 comprising a digital display 11, such as an LED display, e.g., an OLED display and/or an LCD display. An OLED display is configured to show the controls and alarm levels of the gas monitoring system 10 and operates well at temperatures in a range that is below approximately zero degrees Celsius temperatures, e.g., down to approximately −40 degrees F., in accordance with an embodiment of the present disclosure. The digital display 11 also shows all 4 channels that are being monitored (FIGS. 6-8, 20, and 21) and is also operates well at below approximately zero degrees Celsius temperatures (e.g., down to approximately −40 degrees F.). The digital display 11 also serves as the control interface with the main CPU, e.g., the processor 70, of the monitoring system 10. The display 11 alternatively comprises an LCD screen, e.g., for a warm climate, e.g., a warmer-than-freezing climate. The digital display 11 is also configured to render user-friendly menus on a backlit organic LED display with a "min-max" feature for retaining high (maxima) and low (minima) readings for review at any time 4. Emergency Shut Down (ESD) Latch Valve The system 10 comprises an ESD latch valve 40, such as a 24-VDC solenoid valve configured to latch into an open position or a closed position by way of varying a magnetic polarity (FIGS. 1-5, 20, and 21). The ESD latch valve 40 operates in conjunction with a PCB circuit relay 41 (FIG. 16) that receives the alarm signal from the gas monitor or sensor 12 and applies a 50-millisecond electrical burst for actuating by latching (closing) the solenoid valve. The ESD latch valve 40 then shuts-down the gas supply or the air supply that is associated with accumulators, the high/low, or any other actuated valve, electrical element, or mechanical element. The ESD latch valve 40 is also operable in a pressure range approximately 10 psi to approximately 2000 psi and a power range of approximately 6 VDC to approximately 24 VDC.

The ESD latch valve 40 is operable in response to a manual ESD reset switch 44 and is configured for being manually reset only after a respective field supervisor that is designated by the end-user determines that a hazard or a dangerous condition no longer exists (FIGS. 16, 20, and 21). The ESD latch valve 40 optionally comprises a flexible black tubing 42 that is interiorly disposed (FIGS. 4 and 5) couples the fittings 43, such as brass fittings, disposed though and on the weather-proof enclosure 17 for providing an exterior plumbing connection (FIGS. 5, 12, 13, and 14). The ESD latch valve 40 may vent any supply gas in a range of approximately 6 inches to approximately 18 inches away from the weather-proof enclosure 17, and alternatively, in a range of approximately 6 inches to approximately 120 inches away from the weather-proof enclosure 17 to conform with a given set of hazardous zone. The ESD latch valve 40 can either be installed within a gas monitoring system 10 acting as a main system or proximate at least one slave device 18 for at least one predetermined location.

5. Alarm Features and their Operation

The gas monitoring system 10 uses the different channels, e.g., the 4-channel relays 14 and detector relays 19 (FIGS. 8, 10, and 19-21) to detect the respective gas concentrations (multiple gas sensors available) via the direct-connect sensors 12 (FIGS. 18-21) or the remote, slave sensor 18 (FIG. 17). Upon determination that a gas concentration exceeds limits set by an end-user, the processor 70 then determines, within the programmed scale of limits, what a current concentration should be. Increasing levels of sensed gas concentration trigger higher alarm levels; e.g., alarm levels "1" through "3" (FIG. 20).

An alarm denoted as "Alarm 1" is indicated, through signals to the Modbus transmitter 13 (FIGS. 9 and 19-21), to a field supervisor designated by an end-user, the alarm indicating that a first alarm level has been reached. An alarm denoted as "Alarm 2" is indicated, through signals to the Modbus transmitter 13, to a field supervisor and activates both a 100-dB audible alarm 15 and a red LED visual alarm 16, the alarm indicating that a second alarm level has been reached (FIGS. 15 and 20-21). An alarm denoted as "Alarm level 3" activates the warnings of "Alarm 2" and also sends a further signal to the ESD PCB circuit relay 41 (FIGS. 5, 11, 16, and 19-21) that is associated with the ESD latch valve 40 (FIGS. 1-5) which pulses for 50 ms at 24 VDC, thereby magnetically closing ESD latch valve 40, and thereby shutting-down the gas system or the gas pipeline system of which the system 10 is monitoring.

If while Alarms 1-2 have been activated and the gas concentrations lower, the 4-channel relays 14 (FIGS. 8, 10, and 19-20) are self-resetting and the audible alarms 15 are silenced. If however, Alarm 3 has been activated, only a manual reset of the PCB circuit relay 41 by way of the manual ESD reset switch 44 (FIGS. 5, 11, 16, and 19-21) will re-open the ESD latch valve 40 (FIG. 20). At any time, a field supervisor or employee can read a display 32 comprising a digital display 11, such as an LED display, e.g., an OLED display and/or an LCD display, enabled by a control PCB panel 30 (FIGS. 6-8, 14, and 19-21), wherein the gas concentration levels and recorded high-low levels for each channel are shown.

6. Examples of Site Implementations

The system 10 may be implemented at natural gas production sites. Of the 113 million acres of onshore federal lands open and accessible for oil and gas development, 12.6 million acres were maintained by the BLM in 2013 with 47,427 oil and gas leases and 97,600 producible wells. Just in the West, over 35 million acres of private land is now being leased for oil and gas production. With such high numbers and the growing impact of "fugitive emissions" on employee and environmental safety, the system 10 provides not only early gas detection, but also provides the capability to rapidly shutdown production equipment.

The system 10 may be implemented in relation to pipelines. Over 305,000 miles of interstate and intrastate transmission pipelines exist and comprise over 210 natural gas pipeline systems throughout the United States. These natural gas pipeline systems include over 1,400 compressor stations that maintain pressure on the natural gas pipeline network and assure continuous forward movement of supplies, over 11,000 delivery points, 5,000 receipt points, and 1,400 interconnection points for transferring natural gas throughout the United States, involving 24 hubs or market centers that provide additional interconnections, 400 underground natural gas storage facilities, 49 locations where natural gas can be imported/exported via pipelines, 8 liquefied natural gas (LNG) import facilities, and 100 LNG peaking facilities.

The system 10 may be implemented in relation to mines. Over 50,000 Americans work in coal mines in the nearly 710 coal mines of the 1,300 mines in the US. The Mine Safety and Health Administration (MSHA) maintains effective safety and health management programs that are constantly evaluated to continue find-and-fix programs for identifying and eliminating mine hazards and to provide training for all mining personnel. Among the successful measures MSHA has undertaken to prevent mining deaths are increasing surveillance and strategic enforcement.

The system 10 may be implemented in relation to refineries and manufacturing Facilities. In 2013, there were 139 oil and gas refineries in the United States and over 300,000 manufacturing plants. States and counties operate under tight Environmental Protection Agency (EPA) limitations for which the system 10 provides a tool for determining ambient air quality. Each of our air quality monitors has its own RTU and solar power package allowing for complete individual autonomy. The system 10 disposed in an arrangement forming a "picket line" with sensors disposed in strategic locations provides significant oversight to any facility. Besides the verification and observation role that the system 10 would provide, many possible applications exist. In the event of a crisis, the system 10 assures facility crews that designated evacuation rally-points are truly safe, sends alerts regarding circumstances outside regular facility monitoring, and records events for future review.

The system 10 may be implemented in relation to buildings located in earthquake zones. Estimated is that natural gas has played and will continue to play a role in between 20% and 50% of fires following earthquakes in California alone. Of the 150,000 customers without service after the 1994 Northridge earthquake, 15,000 of the interrupted services were found to have leaks of unspecified severity. During the 2014 Great Utah Shake Out emergency planning discussion, cost of earthquake damage mounted to over $50 billion. Placement of the system 10 in these buildings, combined with a trembler switch and gas detection, could rapidly shut off services in the case of an earthquake or subsequent leaks.

Information as herein shown and described in detail is fully capable of attaining the above-described feature of the present disclosure, the presently preferred embodiment of the present disclosure, and is, thus, representative of the subject matter which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the present disclosure.

What is claimed:

1. A method of monitoring at least one gas by way of a gas monitoring system for continuously detecting leakage of at least one gas and being operable in an extreme climate condition, the method comprising: providing a gas monitoring system, the system providing comprising: providing a processor; providing at least one emergency shutdown valve responsive to a set of instructions from the processor; and providing a user interface in communication with the processor; commencing operation by powering the gas monitoring system; sensing a gas level by way of at least one direct-connect sensor; determining the gas level using data obtained by the at least one direct-connect sensor; determining whether the gas level is less than a threshold value; if the gas level is less than the threshold value, sensing a gas level by way of at least one direct-connect sensor; if the gas level is at least the threshold value, proceeding to performing a limit test, and performing the limit test; if the gas level is less than the limit, determining the gas level using data obtained by the at least one direct-connect sensor; if the gas level is equal to the limit, sending a warning by way of a first alarm feature; if the gas level exceeds the limit, sending a warning and activating an alarm by way of a second alarm feature; and if the gas level exceeds the limit by a predetermined value, sending a warning, activating an alarm, and activating an ESD latch valve by way of a third alarm feature, and terminating operation of the gas monitoring system.

2. The method of claim 1, wherein the gas monitoring system comprises a plurality of detector relays.

* * * * *